(12) United States Patent
Sakura

(10) Patent No.: US 7,952,730 B2
(45) Date of Patent: May 31, 2011

(54) INFORMATION PROCESSING APPARATUS AND PRINT CONTROL METHOD ATTRIBUTES IN PRINT JOBS

(75) Inventor: Masayuki Sakura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1148 days.

(21) Appl. No.: 11/608,360

(22) Filed: Dec. 8, 2006

(65) Prior Publication Data

US 2007/0146767 A1  Jun. 28, 2007

(30) Foreign Application Priority Data

Dec. 22, 2005 (JP) ................. 2005-370099

(51) Int. Cl.
*G06F 3/12* (2006.01)
*G06F 15/00* (2006.01)
*H04N 1/40* (2006.01)
*H04N 1/46* (2006.01)

(52) U.S. Cl. ........ 358/1.13; 358/1.2; 358/1.9; 358/3.23; 358/537

(58) Field of Classification Search ................. 358/1.13, 358/1.2, 1.9, 3.23, 1.18, 537, 538, 452; 400/76
See application file for complete search history.

(56) References Cited

U.S. PATENT DOCUMENTS

| 2002/0033963 | A1 | 3/2002 | Miyata |
| 2002/0091681 | A1* | 7/2002 | Cras et al. ............... 707/3 |
| 2004/0061897 | A1 | 4/2004 | Onishi |
| 2005/0141941 | A1* | 6/2005 | Narusawa et al. ........... 400/76 |
| 2007/0070374 | A1* | 3/2007 | Boyes et al. ............... 358/1.13 |

FOREIGN PATENT DOCUMENTS

| JP | 2002-091728 A | | 3/2002 |
| JP | 2002211048 A | * | 7/2002 |
| JP | 2003-058334 A | | 2/2003 |
| JP | 2004-126871 A | | 4/2004 |

* cited by examiner

*Primary Examiner* — Thomas J Lett

(74) *Attorney, Agent, or Firm* — Canon U.S.A., Inc. I.P. Division

(57) ABSTRACT

An apparatus and method for controlling printing including setting a print attribute to a specific page or a specific page range in a print job, permitting an application to produce print data, analyzing the print data and searching for a page break code in a case where the application is permitted to produce the print data and the print attribute in the print job is set, and inserting, into the print data, a print attribute command to specify the print attribute, wherein the print attribute command is inserted according to the result of the search for the page break code.

10 Claims, 26 Drawing Sheets

FIG.15

| APPLICATION | VERSION | PAGE BREAK CODE |
|---|---|---|
| APPLICATION A | 1 | showpage |
| APPLICATION B | 1 | spage |
| APPLICATION C | 1 | showpage |
| APPLICATION C | 2 | sp |

FIG.19

Vars/TermAll get exec end end
Restore
showpage ———— 1901
%%PageSize: A4
Vars begin PDF begin Vars/InitAll get exec
%%Page: 2 2

FIG.20

Vars/TermAll get exec end end
Restore
showpage ———— 2001
<</Duplex/True>> setpagedevice ———— 2002
%%PageSize: A4
Vars begin PDF begin Vars/InitAll get exec
%%Page: 2 2

FIG.21

Vars/TermAll get exec end end
Restore
sp ─────── 2101
%%PageSize: A4
Vars begin PDF begin Vars/InitAll get exec
%%Page: 4 4

FIG.22

Vars/TermAll get exec end end
Restore
sp ─────── 2101
<</PageSize [841 1190]/PaperType/Coated>> setpadevice ─ 2202
%%PageSize: A3
Vars begin PDF begin Vars/InitAll get exec
%%Page: 4 4

FIG.27

/sp/showpage load def ——2701

Vars/TermAll get exec end end
Restore
sp ——2702
%%PageSize: A4
Vars begin PDF begin Vars/InitAll get exec
%%Page: 2 2

FIG.28

Vars/TermAll get exec end end
Restore
sp ——2801
<</Duplex true>> setpagedevice ——2802
%%PageSize: A4
Vars begin PDF begin Vars/InitAll get exec
%%Page: 2 2

INFORMATION PROCESSING APPARATUS AND PRINT CONTROL METHOD ATTRIBUTES IN PRINT JOBS

BACKGROUND OF THE INVENTION

1. Field of the Invention

The present invention relates to an information processing apparatus and a print control method that applies to a print system in which a client computer installed with an application and a printer driver is connected to a printer via a communication medium. More specifically, the present invention relates to an information apparatus and a print control method configured to change print attribute in the case where different print attributes are set to specific pages in a midpoint of a print job with respect to print data produced by the application.

2. Description of the Related Art

There is a demand that in performing printing through an application by using a printer driver, a print attribute different than a print attribute for an entire job should be set to a specific page or a specific page range.

For example, in producing a document including a plurality of chapters, there is a case where it is desired that a color paper is used only for a first page of a chapter and a white paper is used for other pages. In this case, the setting is such that a white paper is used for the entire job and a color paper is used only for a first page of a chapter. The latter setting for the color paper is different than the print attribute setting for the entire job. Further, there is a case where it is desired that a setting different than the print attribute setting for the entire job is performed to specific page or page range with respect to paper size, one-sided printing or two-sided printing, finishing, or color setting.

In this regard, in recent years, a printer driver is capable of performing a print attribute setting to a specific page or page range that is different from the print attribute setting for the entire job. Thus, printing can be implemented by changing the print attribute at a page break and applying different print attributes to respective pages. Japanese Patent Application Laid-Open No. 2004-126871 discusses a system in which a rendering command of a document is issued from an application to a rendering unit (i.e., graphic device interface, hereinafter referred to as "GDI") of an operating system (hereinafter referred to as an "OS") and a printer driver receives a metafile that the GDI produces so as to produce print data. In a system like this, a printer driver converts a received metafile into print data according to print settings made page by page. In addition, Japanese Patent Application Laid-Open No. 2003-058334 discusses a technique in which intermediate data that a GDI produces is spooled, the intermediate data is edited according to a setting as to a number of copies for each page, and a print instruction is issued via the GDI again so as to produce print data whose number of copies is separately set for each page.

As described above, a typical printer driver receives a rendering command from an application via a GDI so as to produce a print job by packing print data for each page which is produced based on the received rendering command.

Meanwhile, in recent years, an application itself directly produces a page description language (PDL) code so as to send the produced PDL code via a printer driver. For example, an application produced by Adobe Systems, Inc. is capable of producing print data having a postscript (hereinafter referred to as "PS") format. The PS data can also be produced by a printer driver. However, with respect to a document (image) produced by the application of Adobe Systems, Inc., when a rendering command is issued according to a GDI of an OS, a quality of the image is degraded because the image quality depends on a function of the GDI.

For example, a GDI does not reproduce gradation very well. Accordingly, in conforming to a GDI rendering command in Microsoft® Windows®, it is necessary to segment a rendering command by a unit in which lightness and color tint are stepwise changed. Accordingly, it is difficult to perform gradation such as tone reproduction.

In the technique in which an application itself produces print data, high-quality print data can be produced without conforming to a rendering function of a GDI. In such a print processing system in which an application produces print data that can be interpreted by a printing apparatus (a system like this is called a "pass-through system"), a rendering unit of an OS and a printer driver do not process the print data. In the pass-through system, a printer driver does not perform analysis and editing to print data, and accordingly, a print attribute cannot be changed while a print job is being performed.

In order to eliminate this defect, Japanese Patent Application Laid-Open No. 2002-091728 discusses a technique in which when a specific print setting such as N-up and bookbinding is specified through a user interface screen of a printer driver, use of a pass-through processing system is inhibited so that the printer driver can produce print data, instead of allowing an application to produce print data. Since a printer driver inhibits an application to use a pass-through processing system, a print attribute can be changed page by page, in addition to performing N-up printing and a bookbinding printing. However, in this case, just as in the case of a conventional technique, an application needs to issue a rendering command by using a rendering function that depends on a GDI of an OS, which degrades print quality.

As described above, in a pass-through processing system of a conventional technique, an application itself directly produces a PDL code, and a printer driver does not perform any processing. Accordingly, a print attribute cannot be changed while a print job is being executed.

In addition, in processing where a printer driver produces print data, an application issues a rendering command in conformity to a rendering processing capacity of an OS. Accordingly, quality of a document produced by a high-performance application is undesirably degraded.

In order to eliminate these defects, there is a method of producing a print job called a "job ticket system". In the job ticket system, print data produced by an application is sent to a printer together with a job ticket that includes a print attribute for each page. The job ticket refers to data that include settings for print attributes. The job ticket is added to a header portion of a print job and sent to a printer separate from print data for each page. In this manner, the print data itself is produced by an application, and accordingly, the high image quality can be maintained. In addition, a print setting can be changed while a print job is being performed because print settings for each page are described in the job ticket.

However, in the job ticket system, a printer needs to analyze a job ticket. Accordingly, a function for changing a print attribute during a print job cannot be provided to a general-purpose printing apparatus.

SUMMARY OF THE INVENTION

The present invention is directed to a technique that can be applied to a general-purpose printing apparatus in which, even if an application produces print data, a printer driver adds a command to change a print attribute to print data. Accordingly, the print attribute can be changed during a print job.

According to an aspect of the present invention, an information processing apparatus configured to execute an application that issues a rendering command so as to print a document and a print control program serving as a printer driver that produces a print job including print data that a printing apparatus can interpret based on the rendering command includes a print attribute setting unit configured to set a print attribute to a specific page or a specific page range in the print job according to an instruction by a user issued through a print setting screen of the print control program, a permission unit configured to permit the application to produce print data that the printing apparatus can interpret, an analysis unit configured to analyze the print data produced by the application and search for a page break code when the application is permitted by the permission unit to produce the print data and when the print attribute setting unit sets the print attribute for a specific page or a specific page range in the print job, and a command insertion unit configured to insert a print attribute command to specify the print attribute, into the print data produced by the application so as to provide the specific page or the specific page range with the print attribute, according to a result of search for the page break code by the analysis unit.

Other features of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 15 illustrates a page break code table according to the first exemplary embodiment of the present invention.

FIG. 19 illustrates the PDL code that includes a code "showpage" according to the exemplary embodiment of the present invention.

FIG. 20 illustrates the PDL code that includes a print attribute changing code according to the exemplary embodiment of the present invention.

FIG. 21 illustrates the PDL code that includes a code "sp" according to the exemplary embodiment of the present invention.

FIG. 22 illustrates the PDL code that includes the print attribute changing code according to the exemplary embodiment of the present invention.

FIG. 27 illustrates the PDL code that includes the page break code according to the second exemplary embodiment of the present invention.

FIG. 28 illustrates the PDL code that includes the print attribute changing code according to the second exemplary embodiment of the present invention.

DETAILED DESCRIPTION OF THE EMBODIMENTS

Various exemplary embodiments, features, and aspects of the invention will be described in detail below with reference to the drawings. It should be noted that the relative arrangement of the components, the numerical expressions and numerical values set forth in these embodiments do not limit the scope of the present invention unless it is specifically stated otherwise.

First Exemplary Embodiment

<System Configuration>

Figure 1:
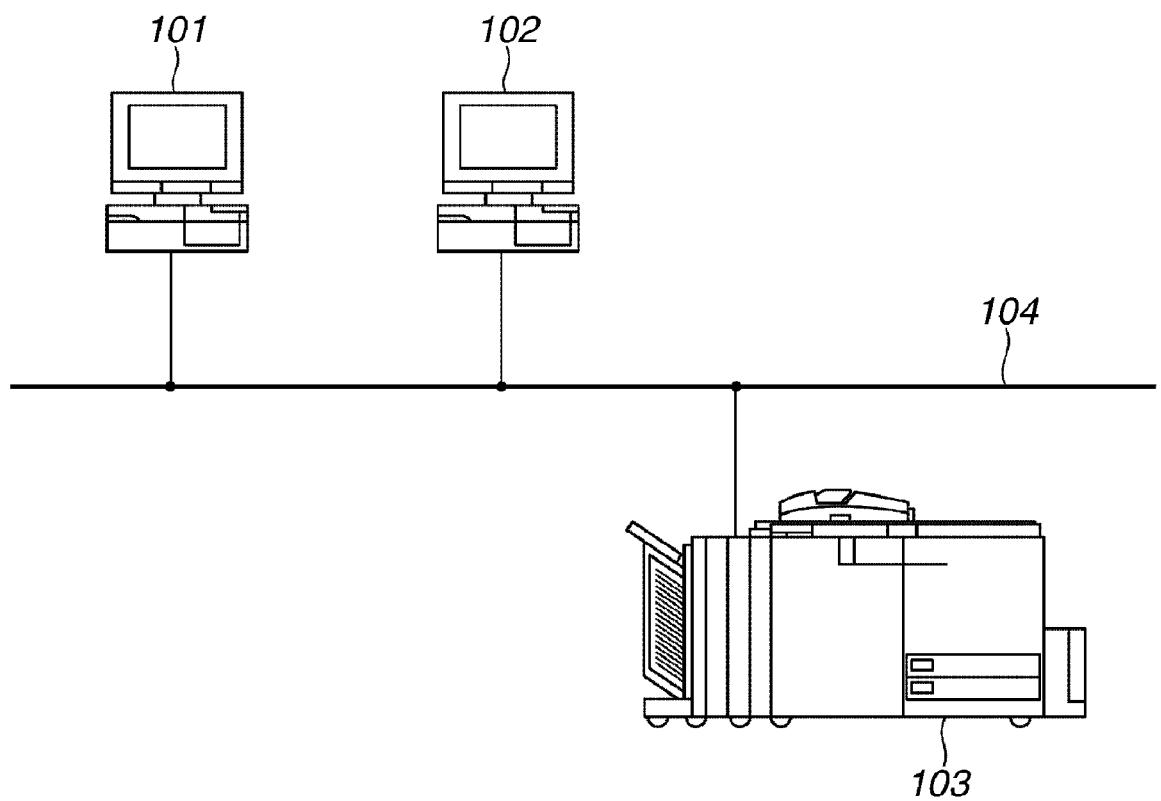
FIG. 1 illustrates a printing system according to an exemplary embodiment of the present invention.

FIG. 1 illustrates a system configuration according to an exemplary embodiment of the present invention.

Referring to FIG. 1, a printing system according to the present exemplary embodiment includes a client personal computer (PC) 101, a client PC 102, and a printer 103, which are mutually connected via a network 104. In this printing system, two client PCs are illustrated in FIG. 1 to show that a plurality of client PCs exist on the network 104. Since the two client PCs have a same configuration, only the client PC 101 is described below as a representative of the client PCs.

The client PC 101 is installed with applications for producing a document and a printer driver that produces print data that the printer 103 can interpret. The printer 103 interprets the print data that is input through the network 104 so as to perform print processing of printing data for each page according to print attributes.

<Hardware Configuration of a Host Computer and the Printer>

Figure 29:
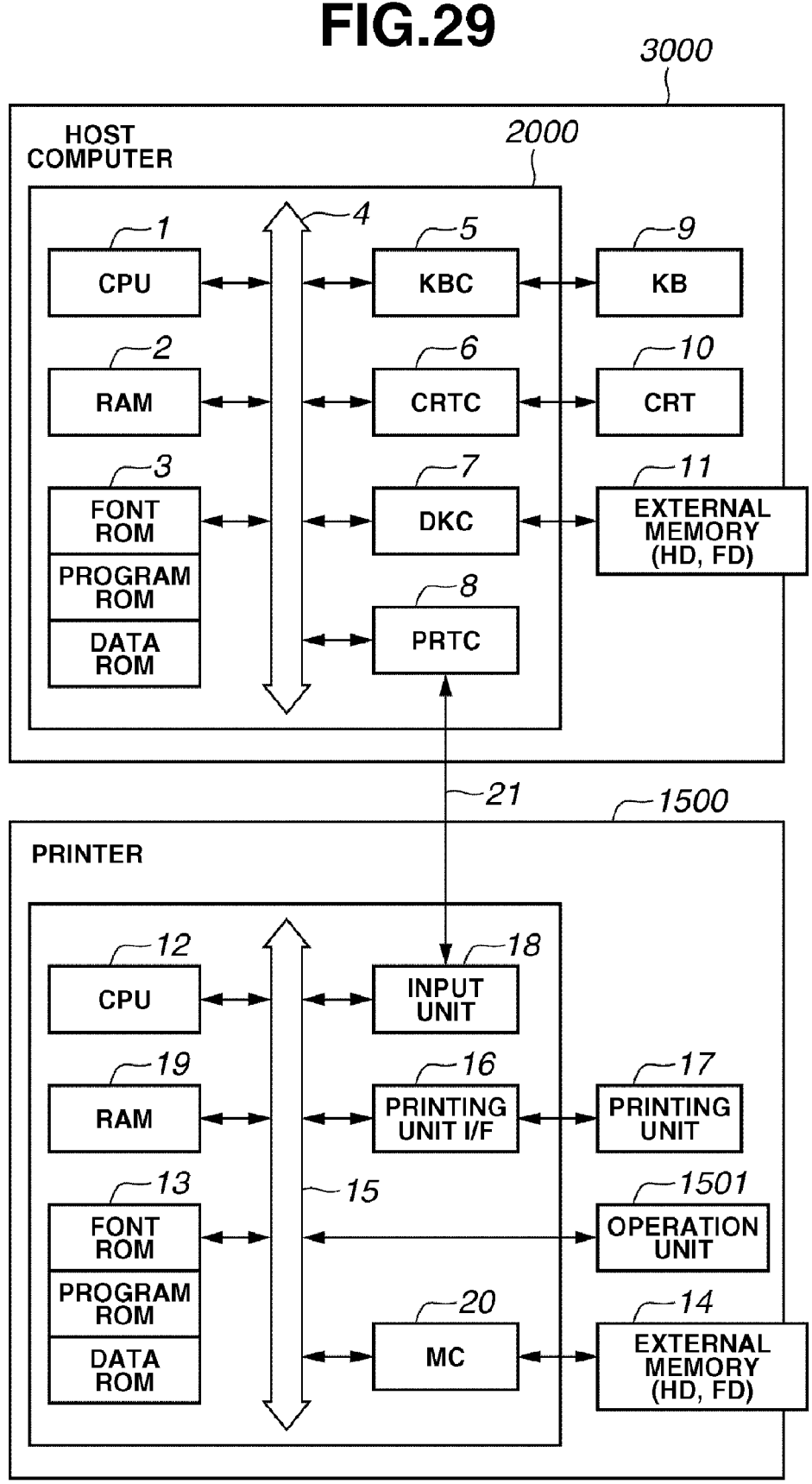
FIG. 29 illustrates a hardware configuration of the printing system according to the embodiment of the present invention.

FIG. 29 illustrates an example of a hardware configuration of a host computer 3000, which corresponds to the client PC 101 and a printer 1500, which corresponds to the printer 103. The present invention can be applied to any system regardless of whether an apparatus is connected via a network such as a LAN and a WAN, or whether the system includes a single apparatus or a plurality of apparatuses, as long as the system implements functions of this exemplary embodiment.

Referring to FIG. 29, the host computer 3000 includes a CPU 1 that operates based on a document processing program that is stored in a program ROM area of a ROM 3 or in an external memory 11. The CPU 1 controls processing of a document that includes a graphic, an image, a text, and a table in a mixed manner and print processing performed based on the document processing, including processing according to each exemplary embodiment of the present invention as described below.

The CPU 1 controls each device that is connected to a system bus 4. The program ROM area of the ROM 3 and the external memory 11 respectively store a program of an OS for controlling the CPU 1 and the like. A font ROM area of the ROM 3 and the external memory 11 respectively store font data and the like that is used in the document processing. A data ROM area of the ROM 3 and the external memory 11 store various data used in the document processing. A RAM 2 functions as a main memory and a work area for the CPU 1.

A keyboard controller (KBC) 5 controls a key input from a keyboard (KB) 9 and a pointing device (not shown). A CRT controller (CRTC) 6 controls a display by a CRT display (CRT) 10. A disk controller (DKC) 7 controls access between the external memory 11 and a hard disk (HD) and a floppy disk (FD).

The external memory 11 stores a boot program, various applications, font data, a user file, an editing file, and a print control program (hereinafter referred to as a "printer driver") of the present invention. A printer controller (PRTC) 8 is connected to the printer 1500 via an interactive interface 21 in order to perform processing for controlling communication with the printer 1500.

The CPU 1 opens various windows on the CRT 10 according to commands instructed by a user using the keyboard 9 or pointing device in order to perform various data processing. To perform a printing operation, a user opens a window related to print settings in order to perform setting of a printer and setting of the printer driver as to a print processing method including selection of a print mode.

The printer 1500 is controlled by a printer CPU 12. The printer CPU 12 outputs an image signal as print output information to a printing unit (printer engine) 17, which is connected to a system bus 15 via a printing unit interface (I/F) 16, based on a control program stored in a ROM 13 or an external memory 14.

The control program for the CPU 12 is stored in a program ROM area of the ROM 13. In a font ROM area of the ROM 13, font data used in producing the print output information is stored. In a data ROM area of the ROM 13, in the case of a printer that does not include the external memory 14, such as a hard disk (HD), information utilized on a computer is stored.

The CPU 12 is capable of processing communication with a computer via an input unit 18. Thus, the CPU 12 is capable of notifying information in a printer to the host computer 3000. A RAM 19 functions as a main memory and a work area for the CPU 12. Memory capacity can be expanded using an optional RAM connected to an additional port (not shown). The RAM 19 is used as an output information expansion area, an environmental data storage area, and a non-volatile RAM (NVRAM).

Access to the external memory 14 and an IC card is controlled by a memory controller (MC) 20. The external memory 14 is connected as an optional memory to store font data, an emulation program, and form data. The input unit 18 includes a switch for an operation on an operation screen and an LED display device. The printer 1500 can include an NVRAM (not shown) to store printer mode setting information that is sent from an operation unit 1501.

The printing unit 17 is an electrophotographic engine. Accordingly, the print data recorded onto a medium such as a paper by dots of a toner. The printing method of the present invention is not limited to the electrophotographic system. For example, the present invention can be applied to any printing apparatus in which dots are formed to perform printing, such as an inkjet printer.

<Outline of an Operation of the Printer Driver>

Figure 2:
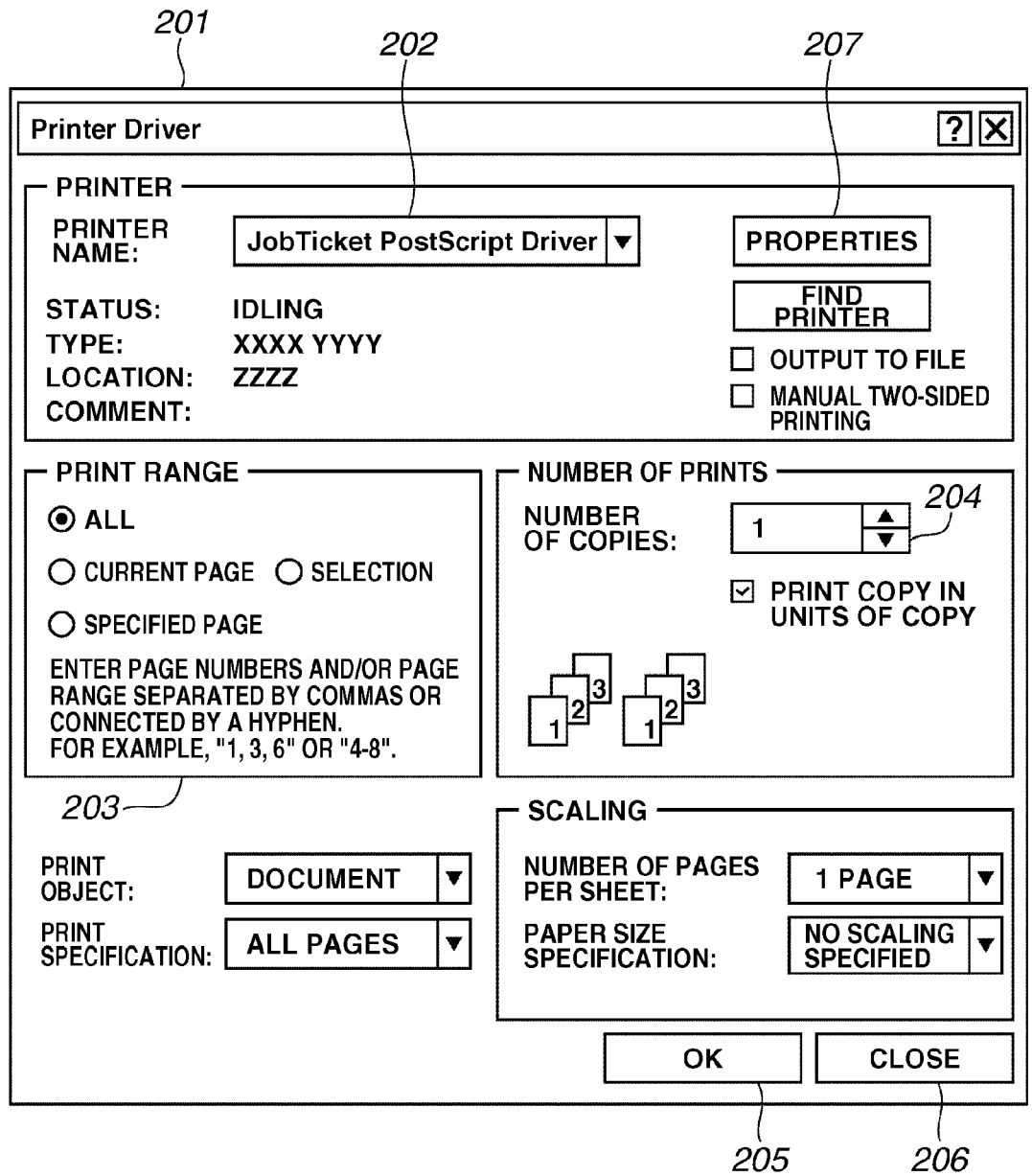
FIG. 2 illustrates a property sheet of a printer driver according to the exemplary embodiment of the present invention.

FIG. 2 illustrates a print dialog screen displayed on a display screen when a user issues a print instruction from an application. FIGS. 3 through 7 respectively illustrate an example of a user interface (also referred to as a "print setting screen") provided by the printer driver that is the print control program of the present invention.

Referring to FIG. 2, a print dialog screen 201 is displayed when a user selects a print command from the application, and is used for performing a setting as to an output destination and a simple print setting. Among setting items in the print dialog screen 201 is a field 202 by which a user selects a printer driver for the output destination that is a target of printing. An IP address of the printing apparatus is set to each printer driver as a port of the output destination. The selection field 202 allows a user to select the device the user desires to use as the output destination for a print job.

A page setting control field 203 is used for selecting what page or pages from the document are to be printed. A print count setting control field 204 is used for specifying the number of copies of the page(s) selected in the page setting control field 203 that are to be printed. The user increases or decreases the number of copies by selecting the appropriate arrow of the print count setting control field 204. A property button 207 is used to set detailed properties associated with the device selected in the sending destination selection field 202. In response to selection of the property button 207 by a user, various detailed setting screens as illustrated in FIGS. 3 through 6 are displayed on a display screen of the client PC 101.

When a user selects an OK button 205 printing according to the settings selected by the user and/or the default settings is initiated. Selection of a cancel key 206 results in cancellation of the printing.

FIGS. 3 through 7 respectively illustrate an operation screen (graphical user interface (GUI)) displayed on a screen of the client PC 101 in response to selection of the property button 207 on the operation screen. The GUI is provided by the printer driver and is displayed on the display through the OS.

In the operation screen, tab keys such as a "page setting", "finishing", and "print quality" are shown. The user selects the tab keys to perform settings as to various different detailed print output conditions.

Figure 3:
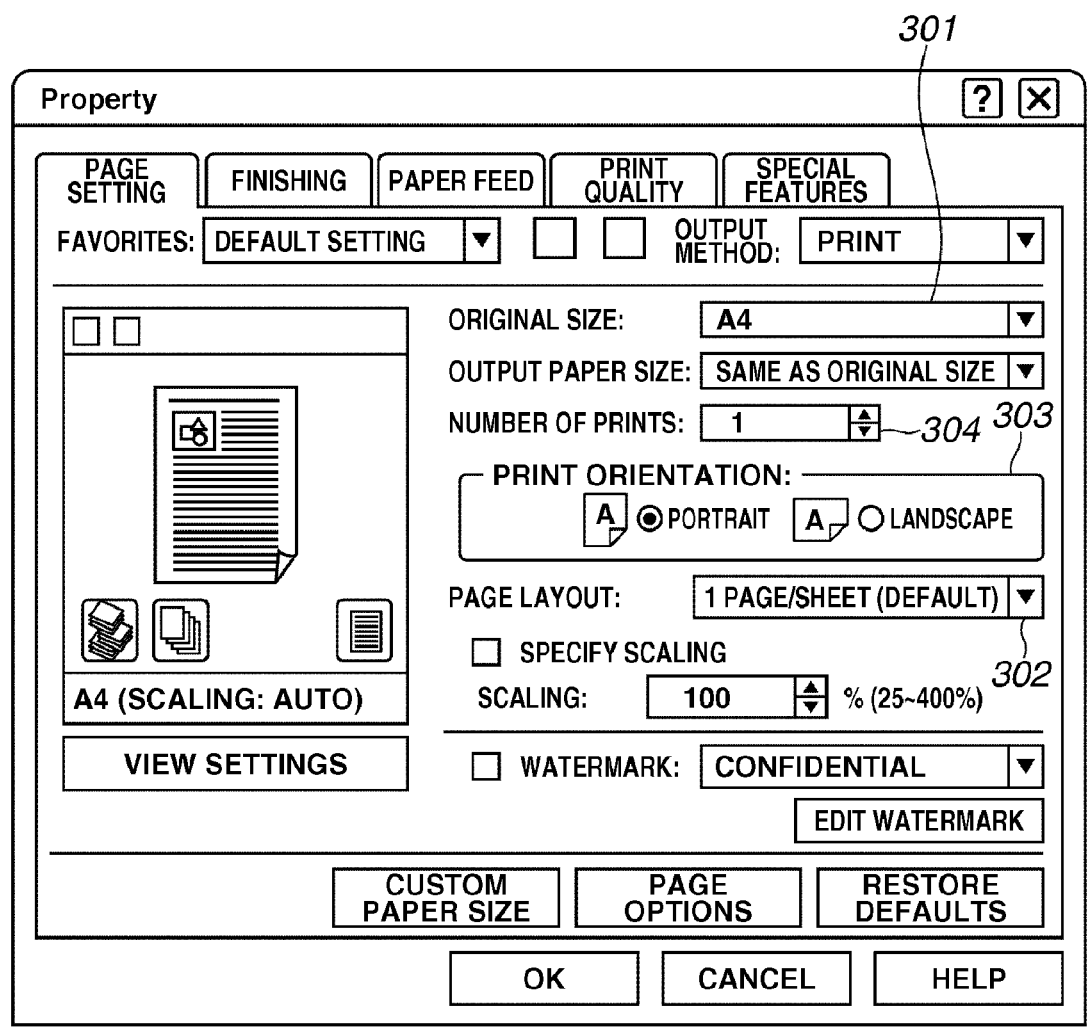
FIG. 3 illustrates a page setting sheet of the printer driver according to the exemplary embodiment of the present invention.

FIG. 3 illustrates an example of an operation screen displayed by the printer driver when the user selects the "page setting" tab. In the screen illustrated in FIG. 3, a paper size setting field 301 allows a user to set the paper size of a document that is input from the application and the paper size of a recording paper on which the document is to be printed. A page layout setting field 302 allows a user to select a layout mode for arranging and forming a plurality of pages on the same single recording paper.

A paper orientation setting field 303 allows a user to set whether the document to be printed in a portrait (vertical) orientation or a landscape (horizontal) orientation. A copy number setting field 304 allows a user to set the number of prints to be made for a print job.

Figure 4:
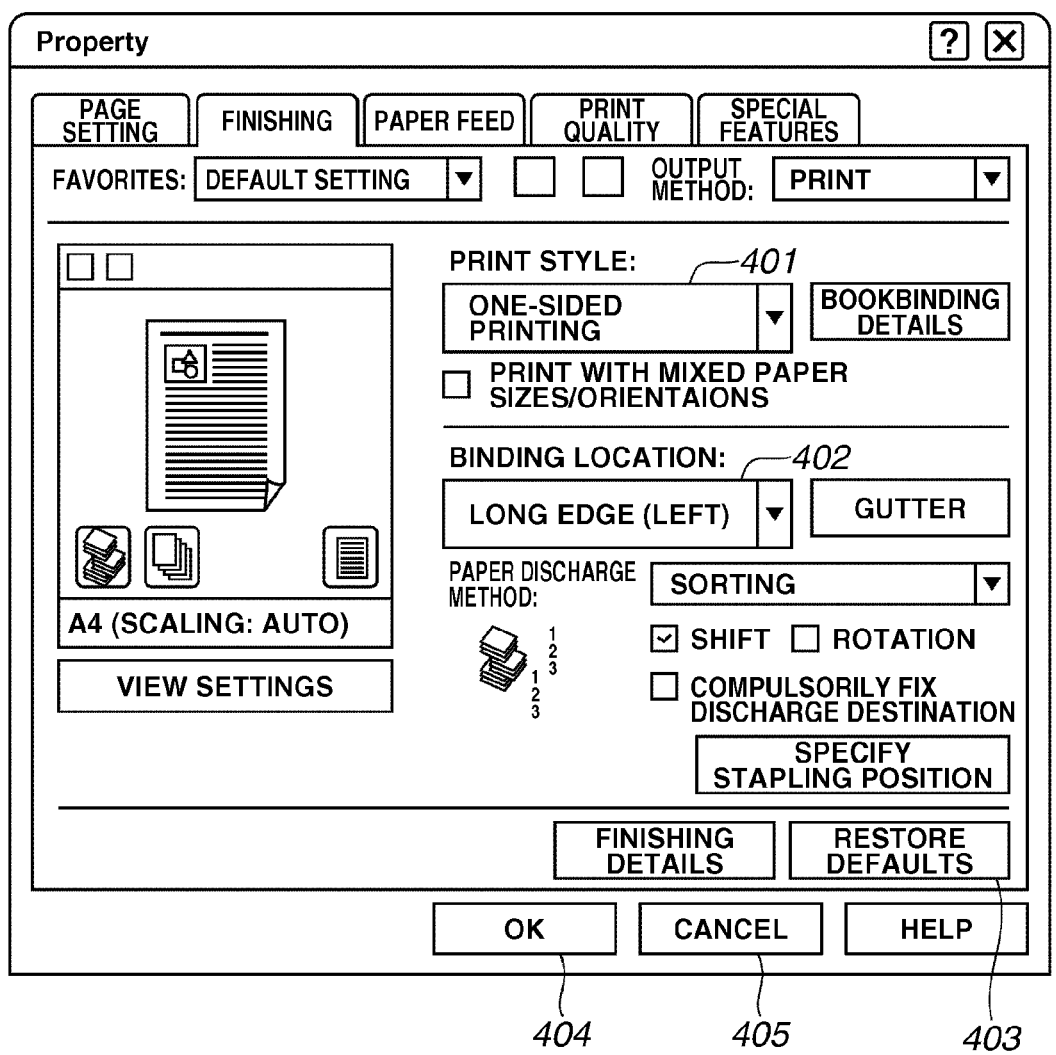
FIG. 4 illustrates of a finishing sheet of the printer driver according to the exemplary embodiment of the present invention.

FIG. 4 illustrates an example of an operation screen displayed by the printer driver when the user selects the "finishing" tab. The setting for finishing includes unique setting information related to the finishing function of the printing apparatus, such as stapling finishing, sorting, punching, and bookbinding.

In the operation screen illustrated in FIG. 4, a printing method setting field 401 allows a user to select a printing method, which includes but is not limited to, one-sided printing, two-sided printing, and bookbinding printing. A binding margin setting field 402 allows a user to set a bookbinding orientation of the document to be printed. The bookbinding orientation includes, but is not limited to, a "long edge (left)", a "long edge (right)", a "short edge (top)", and "short edge (bottom)".

When a user selects a restore defaults key 403, any print details settings made via the operation screen are returned to default values. When the user selects an OK key 404, any print detail settings made via the operation screen become effective, and then the screen returns to the screen illustrated in FIG. 2. When the user selects a cancel key 405, any print detail settings are canceled, and the screen returns to the screen illustrated in FIG. 2.

Although not illustrated in FIG. 4, when a user selects the "paper feed" tab, the user can specify properties associated with the way paper is fed into the printer 103. When a user selects the "print quality" tab, the user can select and/or set properties affecting the appearance of the document, such as resolution and halftone, when the document is printed.

Figure 5:
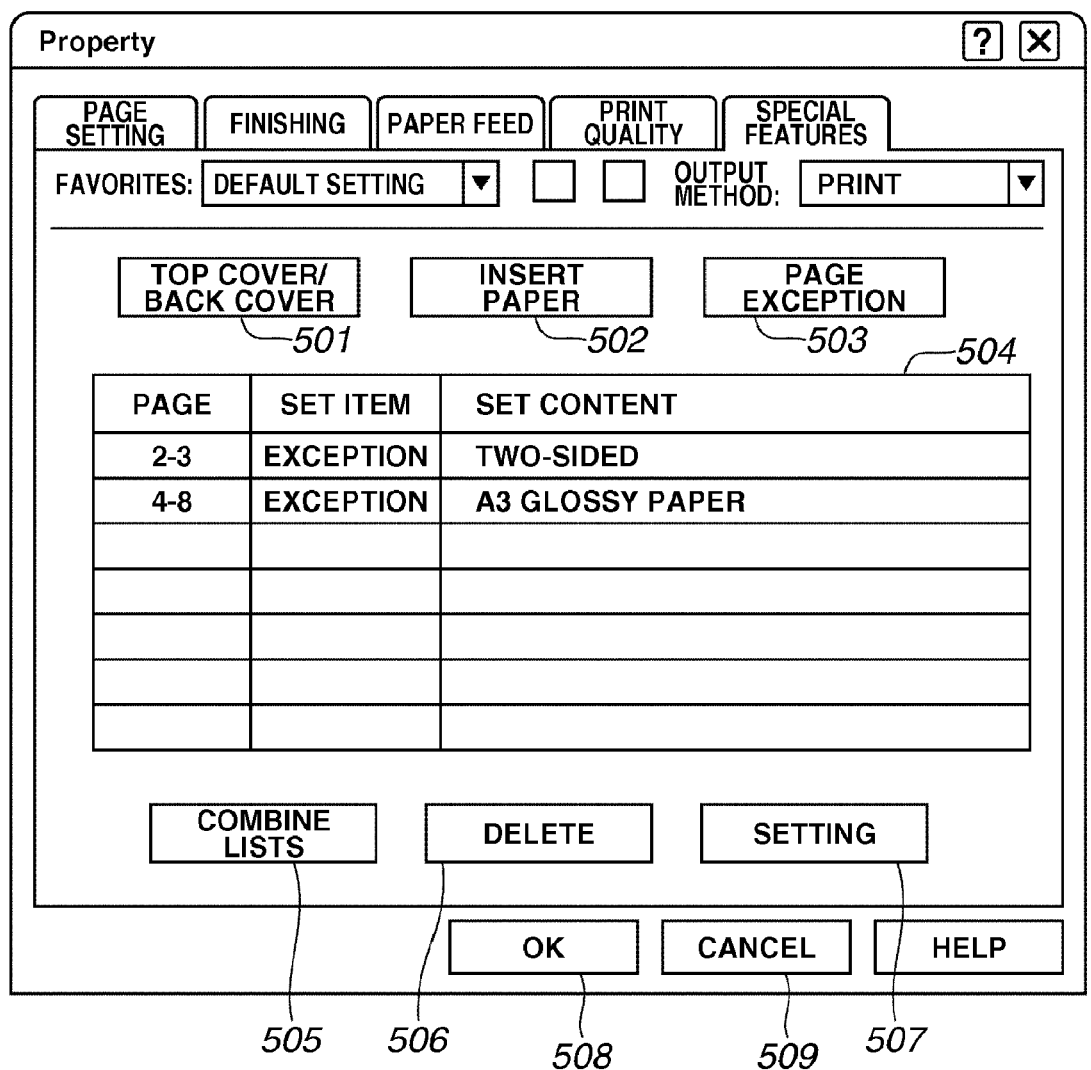
FIG. 5 illustrates a special setting sheet of the printer driver according to the exemplary embodiment of the present invention.

FIG. 5 illustrates an operation screen displayed when the user selects the "special features" tab. The screen illustrated in FIG. 5 allows a user to set print attributes for specific pages of a print job. These settings are different than and separate from the print attributes which are set for the entire print job using the "page setting", "finishing", "paper feed", and "print quality" tabs discussed above.

Referring to FIG. 5, a top cover/back cover setting button 501 is a button for setting a top cover and a back cover separate from a document body. An insert paper button 502 is a button for a setting as to a paper to be inserted separate from a document body. A page exception setting button 503 is a button for performing a setting for a specific page or a specific range of pages, different from the job setting.

A special settings list 504 displays a list of items and settings different from the job settings that are set by above described buttons. A left column is a page column that indicates a specific page or a specific page range to which the setting is performed. A center column indicates an item for the setting. A right column displays a content of the setting.

With respect to a group of special settings that are enumerated in the special setting list 504, when the same settings are set for adjacent pages or page ranges, the lists of items can be combined using a combining button 505. The lists are combined in a manner such that a user selects the adjacent settings to be combined from among the special settings list 504 and then selects the combining button 505. In addition, if there is a setting that a user wishes to delete from the special settings list 504, the user selects the settings to be deleted and then selects a delete button 506.

If the user wishes to change a content of setting among the special settings enumerated in the special setting list 504, the user selects the settings to be changed and then selects a setting button 507 to change the setting. The contents of the screen displayed in the screen of FIG. 5 is only an example, and any other items that would allow setting of printing attributes can be displayed. When the user selects an OK key 508, any settings made via the operation screen become effective, and then the screen returns to the screen illustrated in FIG. 2. When the user selects a cancel key 509, any settings are canceled, and the screen returns to the screen illustrated in FIG. 2.

Figure 6:
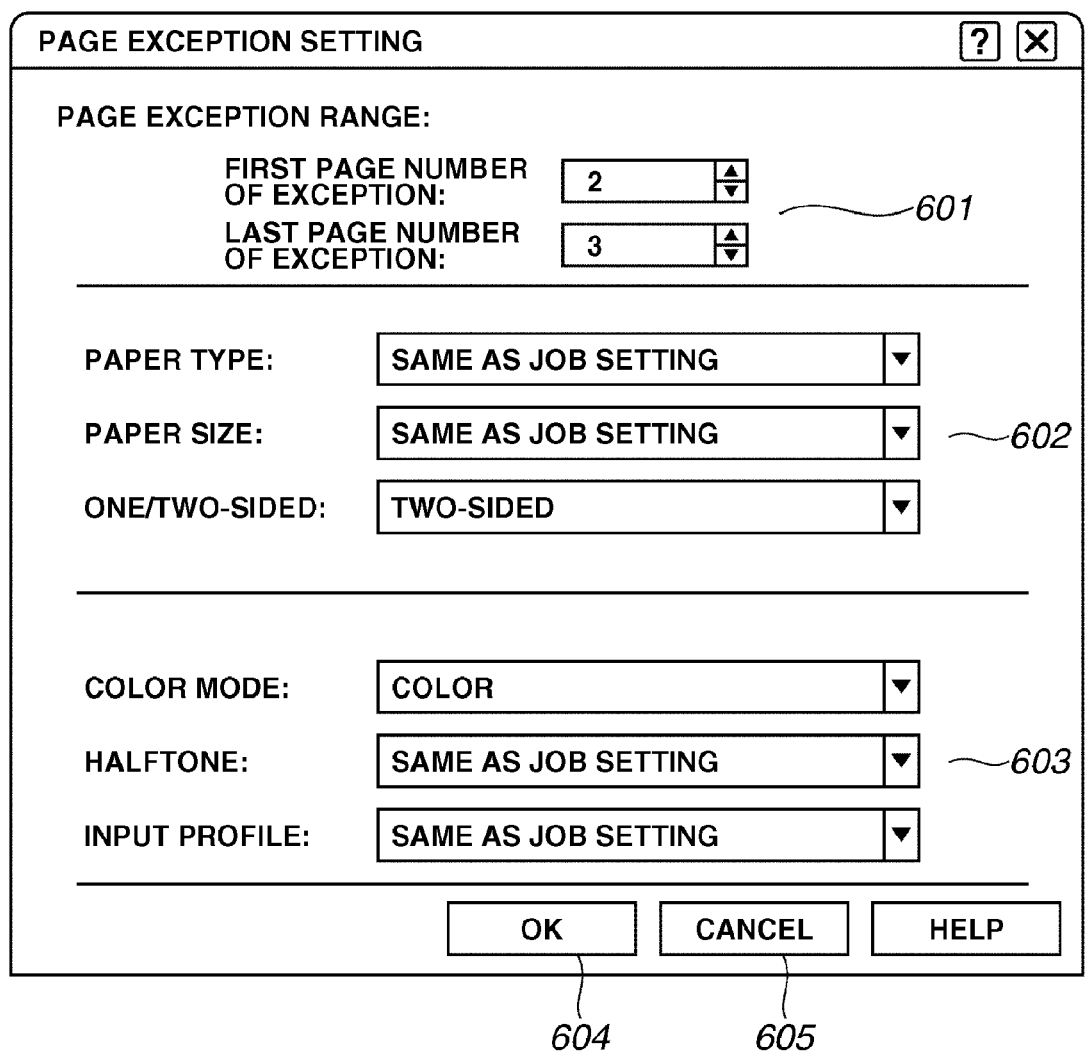
FIG. 6 illustrates a page exception detailed setting dialog of the printer driver according to the exemplary embodiment of the present invention.

FIG. 6 illustrates a dialog for the page exception setting that is displayed when a user selects the page exception button 503 in the special setting property sheet illustrated in FIG. 5. By using the dialog for the page exception setting, the user can perform a setting for a specific page and/or a page range, which is different than the setting for a job.

Referring to FIG. 6, a control field 601 is a field for setting pages and a page range. If a specific page is specified, the user inputs the same page number to both an item "first page number of exception" and an item "last page number of exception" and the value set by the controls described below are applied only to the specified page. A control field 602 is used for performing settings for the page and/or page range set in the control field 601, which are different than the settings for a job. The user can set a paper type, a paper size, and whether one-sided printing or two-sided printing is applied.

A control field 603 is also used for performing settings for the page and/or page range set in the control field 601, which are different than the settings for a job. In the control field 603, the user can perform a setting related to color. More specifically, the user can set a color mode, a half tone, and an input profile. When the user selects an OK key 604 after performing settings via control fields 601, 602, and 603, the selected settings are applied. In order to cancel the applied settings, the user selects a cancel key 605. When the user selects the cancel key 605, the printer driver discards the settings for each of the control fields 601, 602, and 603, and then terminates the display illustrated in FIG. 6.

Figure 7:
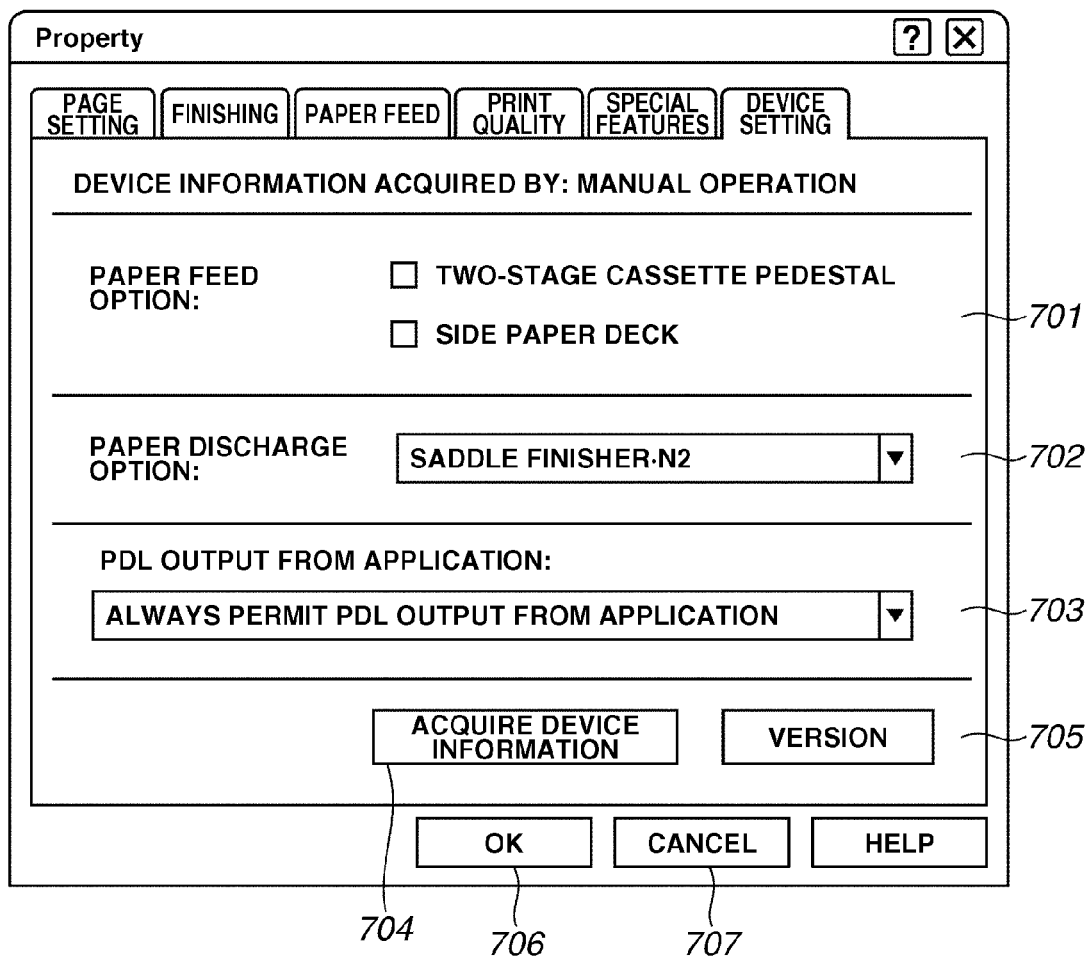
FIG. 7 illustrates a device setting sheet of the printer driver according to the exemplary embodiment of the present invention.

FIG. 7 illustrates a dialog displayed by the printer driver when the menu of the printer driver for a setting is opened. In Microsoft® Windows® for example, the printer driver installed on a computer is opened by selecting an icon on a display, where the icon represents the printer driver.

The dialog illustrated in FIG. 7 includes a "device setting" tab. By using the "device setting" tab in the dialog, the user performs a setting as to device configuration information and the printer driver. A control field 701 is used for setting a mounting state of paper feed options. A control field 702 is used for setting a mounting state of paper discharge options. A control field 703 is used for performing a setting for the printer driver. More specifically, the user performs a setting as to whether an output of a page description language (PDL) code from the application is permitted or inhibited. The control field 703 includes alternative items, namely, an alternative that always permits the PDL output from the application, an alternative that always inhibits the PDL output, and an alternative that indicates whether the PDL output is permitted or inhibited.

The operation mechanism for the PDL code output from the application is described below with reference to FIG. 11 and FIG. 12. When the user selects an OK key 706 after performing settings through control fields 701, 702, and 703, the selected settings are implemented. To cancel the applied settings, the user selects a cancel key 707. Upon selection of the cancel key 707, the printer driver discards the settings, and then terminates the display illustrated in FIG. 7.

As described above, the user selects an OK button on the screens described above in order to implement the various output conditions (i.e., print attributes) that were set via those screens. In the print job, the print attributes associated with a specific page and/or specific range of pages, which are different than the print attributes associated with the entire job are specified as a print command in the print data.

<Configuration of the Printer Driver>

Figure 8:
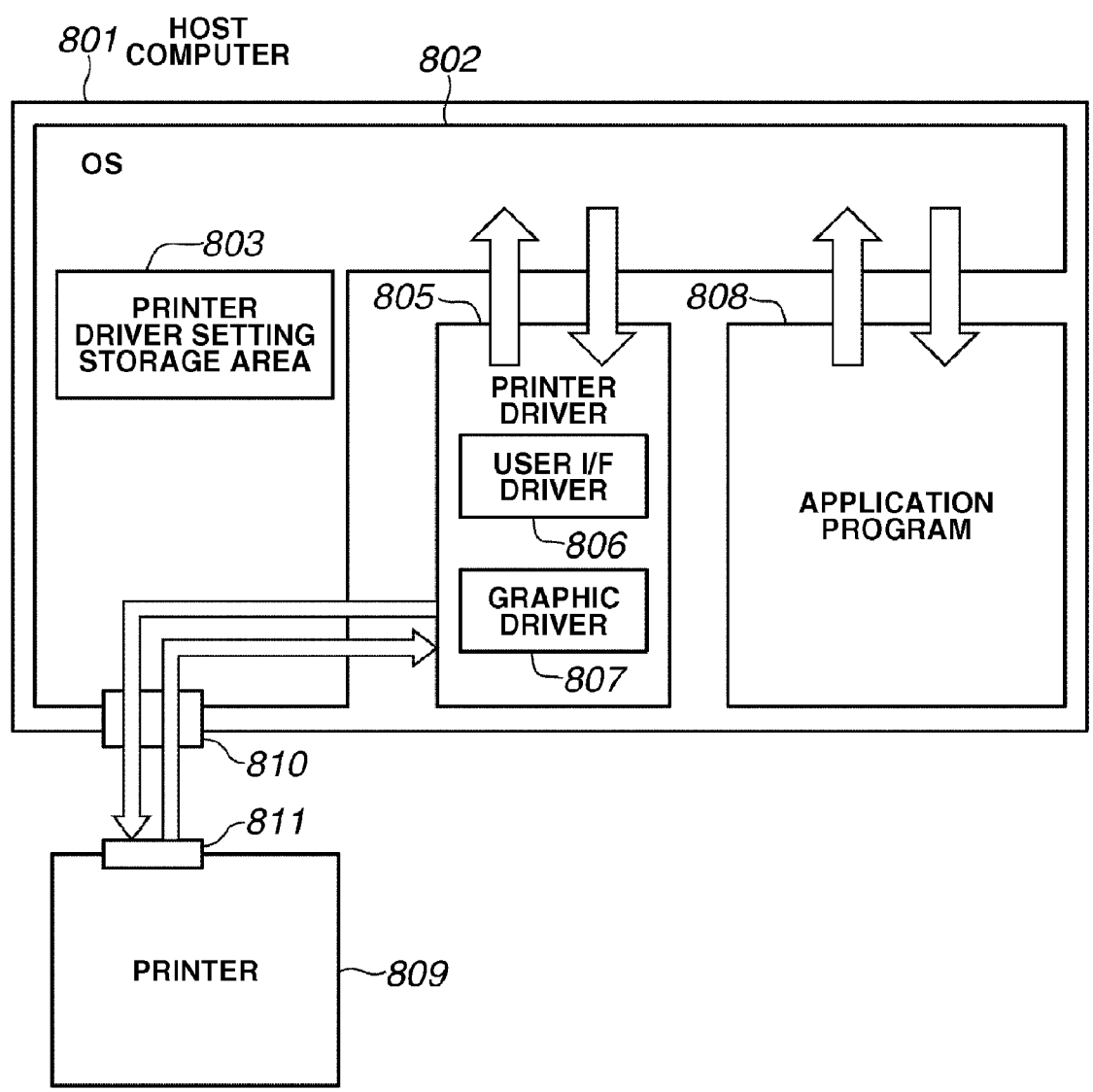
FIG. 8 illustrates a configuration of an application, an OS, and the printer driver installed on a client computer according to the exemplary embodiment of the present invention.

FIG. 8 illustrates a configuration of software in the client PC 101 that includes the printer driver. A host computer 801 is equivalent to the client PC 101 and is installed with an OS 802. A printer driver 805, which is a print control program of the present invention, and application software (hereinafter referred to as "application") 808 are installed on the OS 802. Both the printer driver 805 and the application 808 are controlled by CPU 1.

The printer driver 805 includes a user interface driver 806 and a graphic driver 807. The user interface driver 806 displays a user interface and stores a setting. The graphic driver 807 converts a print rendering command instructed from the application 808 through the OS 802 into print data that can be interpreted by a printer. The user interface driver 806 displays the print setting dialog and the property sheet, as illustrated in FIGS. 2 through 6, when the print setting is instructed from the application 808 through the OS 802.

Printer driver setting storage area 803 is controlled by the OS 802. The print attributes that the user sets using the user interface driver 806 are stored in the printer driver setting storage area 803. The user interface driver 806, the graphic driver 807, and the application software 808 can access the printer driver setting storage area 803 through the OS 802 to read the print attributes that the user sets.

The host computer 801 is connected to a printer 809 through a communication medium, such as a local area network, via a communication interface (I/F) 810 of the host computer 801 and a communication I/F 811 of the printer 809. The graphic driver 807 is capable of sending print data to the printer 809 via the OS 802. In addition, the graphic driver 807 is capable of acquiring printer configuration information and printer status information through the OS 802.

<Processing for Performing the Print Setting and Producing a Print Job>

The following is a description of the processing starting from the selection of a print menu from an application menu, through a print attribute setting on the printer driver 805 to an output of the print job at the printer 809.

The processing for setting the print attributes through the client PC 101 is described with reference to FIG. 9. The application 808 referred to here is a common application. The application corresponds to a type that issues a command for rendering a document to a rendering unit (GDI) of the OS 802.

First, in step S901, when the user selects a menu for a print setting from a menu of the application software 808, the client PC 101 displays the print dialog screen illustrated in FIG. 2. When the user selects the property button 207 in the print dialog screen, then in step S902, the application 808 calls an application programming interface (API) of the OS 802. The API is called to instruct the printer driver 805 to display a property sheet for setting a print attribute. Upon receiving the instruction, in step S903, the user interface driver 806 of the printer driver 805 displays the property sheet for setting the print attribute illustrated in FIG. 3.

Then, in step S904, the user specifies the desirable print attribute setting on the property sheet and the dialog screens illustrated in FIGS. 3 through 7, and then the printer driver 805 inputs the values set for each print attribute. After performing the print attribute setting, the user selects the OK button 205 in order to implement the set print attribute. Upon selecting of the OK button 205, in step S905, the user interface driver 806 calls the API of the OS 802 to store the values, in the printer driver setting storage area 803, set for the print attribute by the user. Thus, the setting of the print attribute and the storing of the values set for the print attribute are completed.

Figure 10:
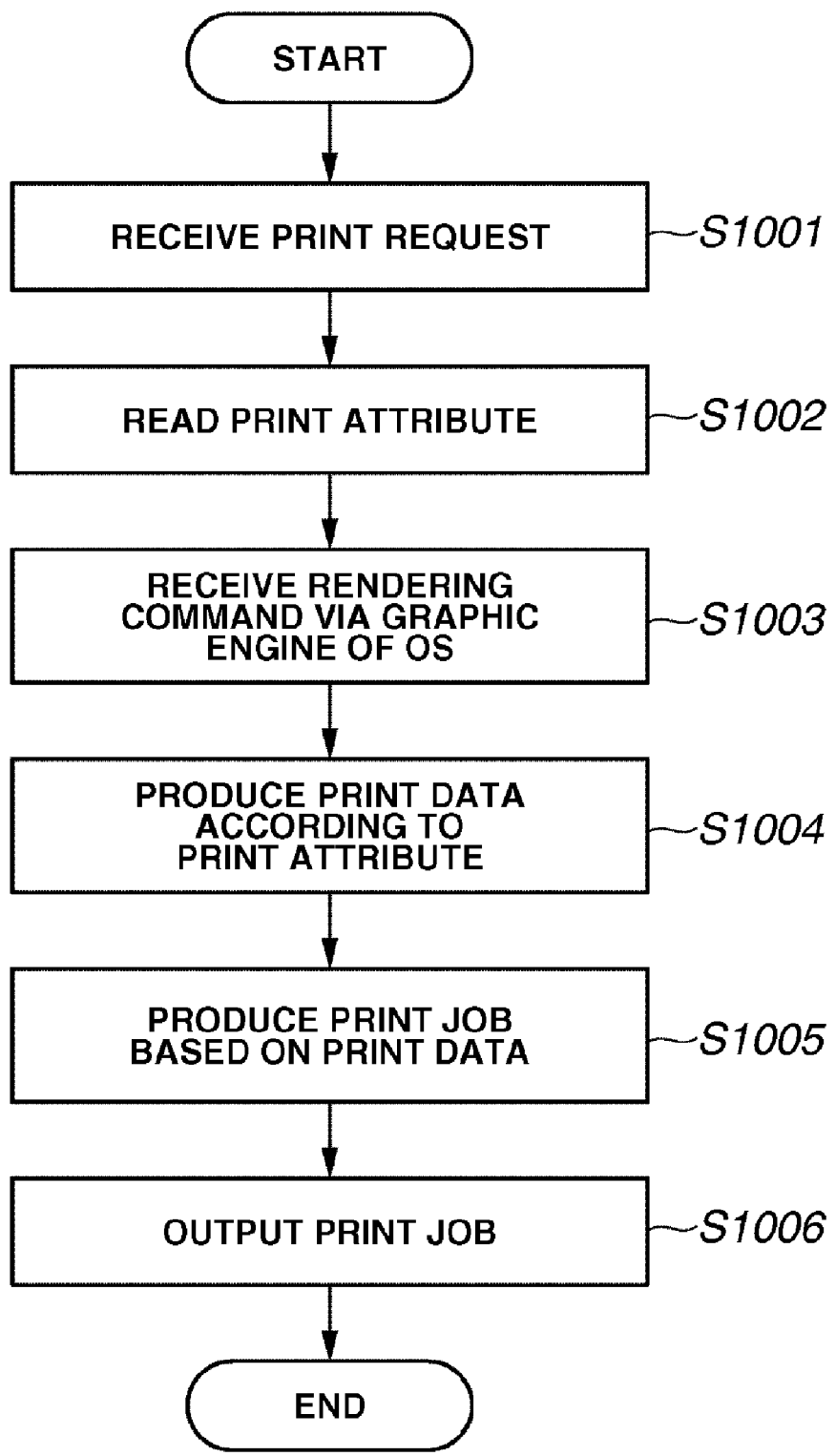
FIG. 10 illustrates a flow of the printing according to the exemplary embodiment of the present invention.

Next, the print processing (processing for producing a print job) in the client PC 101 is described with reference to FIG. 10.

In printing a document, the user selects a print menu from a menu of the application software 808. In step S1001, the application software 808 calls the API of the OS 802 when an instruction to perform printing from the print menu is given by the user. Then, the printer driver 805 receives an instruction to start the printing, which is a print request. The print setting dialog illustrated in FIG. 3 is displayed in the course of the processing. Upon receiving the print request, the OS 802 instructs the printer driver 805 to start printing.

Next, in step S1002, the printer driver 805 reads the print attribute setting values stored in the printer driver setting storage area 803 in response to the instruction to start the printing. Then, the application software 808 issues a rendering command to a graphic engine (GDI) of the OS 802. Then, in step S1003, the OS 802 outputs a rendering function to the printer driver 805. The printer driver 805 receives the rendering command through the OS 802.

Flow then proceeds to step S1004, where the graphic driver 807 of the printer driver 805 produces print data of each physical page from the input rendering command, according to the read print command. Note that the physical page has a page size equivalent to a size of one page of a print paper. A logical page has a page size equivalent to a size of one page in the rendering command for the document that an application outputs. When "one page per sheet" is specified in the page layout, one physical page is equivalent to one logical page. When "two pages per sheet" is specified in the page layout, one physical page is equivalent to two logical pages.

Then, in step S1005, the printer driver 805 performs wrapping with a job control language, such as a job language (JL), based on the produced print data of each physical page, to produce a print job. Then, in step S1006, the printer driver 805 outputs the produced print job via a spooler (not shown) of the OS 802. Thus, the print job is sent to the printer 809 via the network 104.

By performing the processing as described above, the user can set the print attributes and output the print job to the printer 809.

<Application that Produces the PDL Code by Itself>

The following description relates to an application that produces the PDL code by itself. Hereinafter, the application that produces the PDL code by itself is referred to as a "pass-through application". The application that produces the PDL code by itself is called as a "pass-through application" because the PDL code that the application produces by itself is output to "pass through" a printer driver without being processed by the printer driver.

Figure 11:
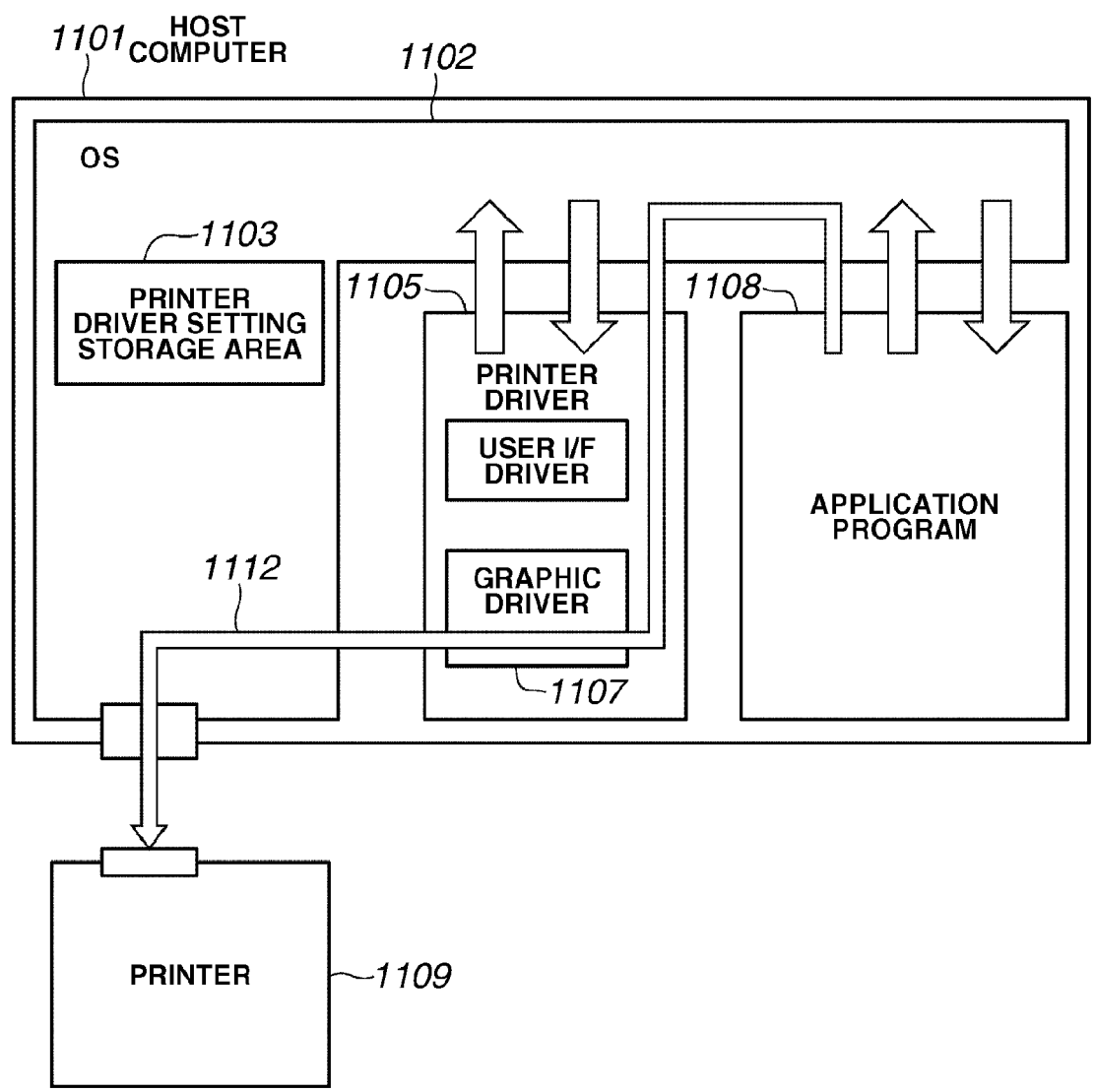
FIG. 11 schematically illustrates a data flow of a pass-through application according to the exemplary embodiment of the present invention.

FIG. 11 illustrates a flow of print data in the pass-through application in a host computer 1101. The operation of the pass-through application is described with reference to FIG. 12.

First, in step S1201, the user selects the print menu from the application menu, which results in a print request being issued from an application program 1108 through an OS 1102 to a printer driver 1105. When necessary, the user sets the print attributes. The flow of setting the print attributes is the same as the flow illustrated in FIG. 9, thus, the detailed description is omitted herein. Then in step S1202, the application program 1108 inquires of the printer driver 1105 whether the printer driver 1105 supports a pass-through print processing system. A user can set whether the application supports the pass-through print processing system. Accordingly, the printer driver 105 switches between permitting or inhibiting the application 1108 from using the pass-through print processing system, based on the setting values in item 703 illustrated in FIG. 7.

If, in step S1202, the printer driver 1105 responds that the printer driver 1105 "does not support the pass-through printing", the processing advances to step S1203. The printing process of step S1203 is the same as print processing described above with respect to FIG. 10, thus, a detailed description is omitted herein. If, in step 1202, the printer driver 1105 responds that the printer driver 1105 "supports the pass-through printing" (i.e., that the pass-through printing is permitted)", the processing advances step S1204.

In step S1204, the application program 1108 issues an instruction to a graphic driver 1107 of the printer driver 1105 to start printing. Then, in step S1205, the graphic driver 1107 reads print attribute setting values stored in a printer driver setting storage area 1103. The application 1108 then acquires the set print attributes from the printer driver 1105.

Then, in step S1206, the application 1108 produces PDL code by itself according to the acquired print attributes. Then, the OS 1102 and the printer driver 1105 transfer and output the PDL code without editing the PDL code through a pass-through printing path 1112. In general, because most of the PDL code data is produced by the application 1108, the data produced by the application 1108 is sent to the printer driver 1105 and a printer 1109 in different transfer packets. Finally, in step S1207, the printer 1109 interprets and renders the print attribute code and the print code to perform printing, and then the processing ends.

<Flow of Printing>

Figure 13:
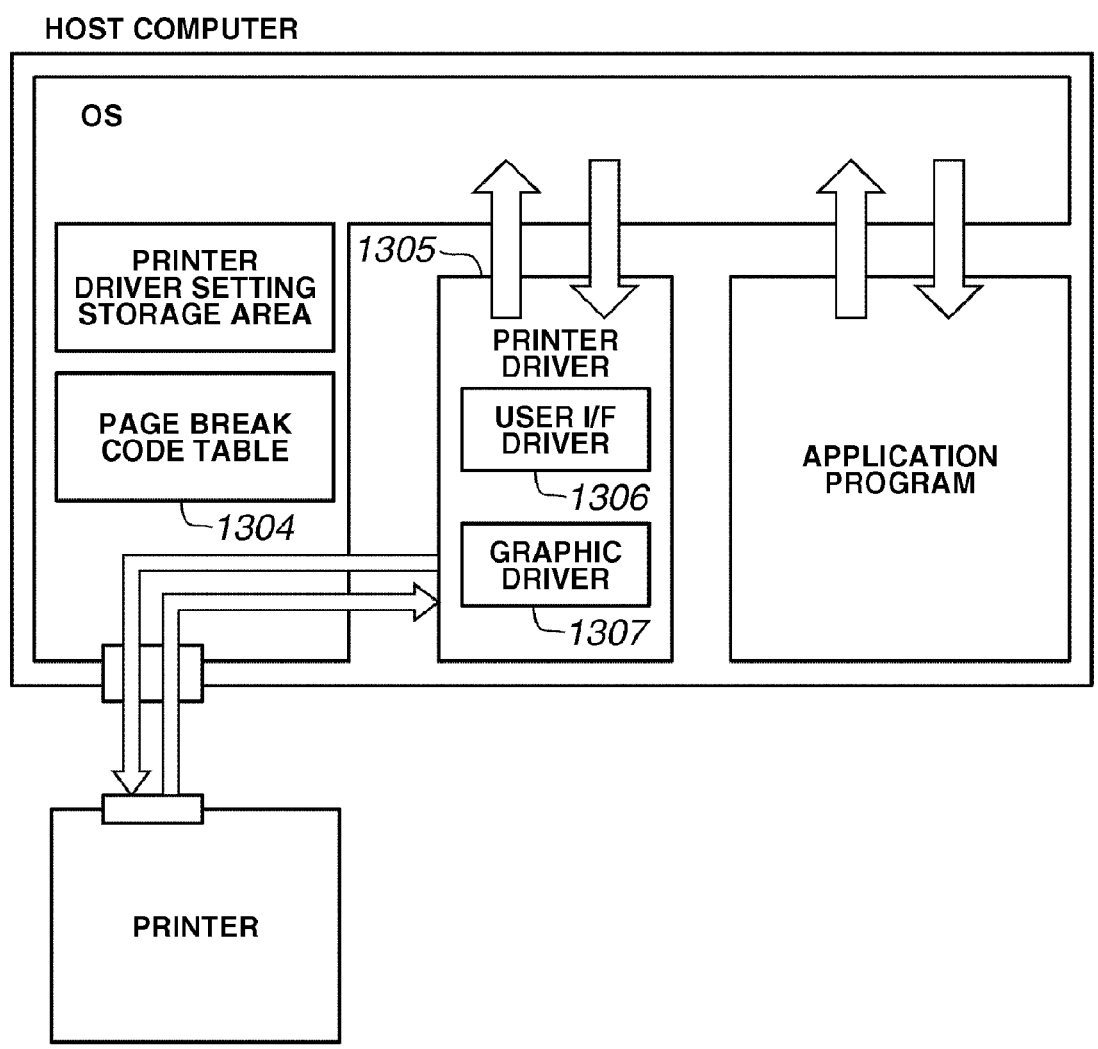
FIG. 13 illustrates a configuration of an application, an OS, and a printer driver installed on a client computer according to a first exemplary embodiment of the present invention.

FIG. 13 illustrates a structure of the printer driver according to the present embodiment. The structure is similar to the structure illustrated in FIG. 8, thus, a detailed description of only the differences is provided herein.

One difference from the structure illustrated in FIG. 8 is an inner structure of a graphic driver that configures the printer driver. The inner structure is described in detail with reference to FIG. 14. Another difference is a page break code table 1304. The page break code table 1304 is a table of codes used for the PDL code produced by the pass-through application itself. The page break code table 1304 is described in detail with reference to FIG. 15.

Referring to FIG. 15, a column 1501 indicates a pass-through application name, a column 1502 indicates a pass-through application version, and a column 1503 indicates a page break code of the PDL code produced by the pass-through application. For example, a row 1504 indicates that the PDL code produced by a version 1 of an application A is "showpage". Accordingly, as is described below, the printer driver needs to switch between page break codes that serve as references for determining a page break, depending on the type of application that issues a print request.

Figure 14:
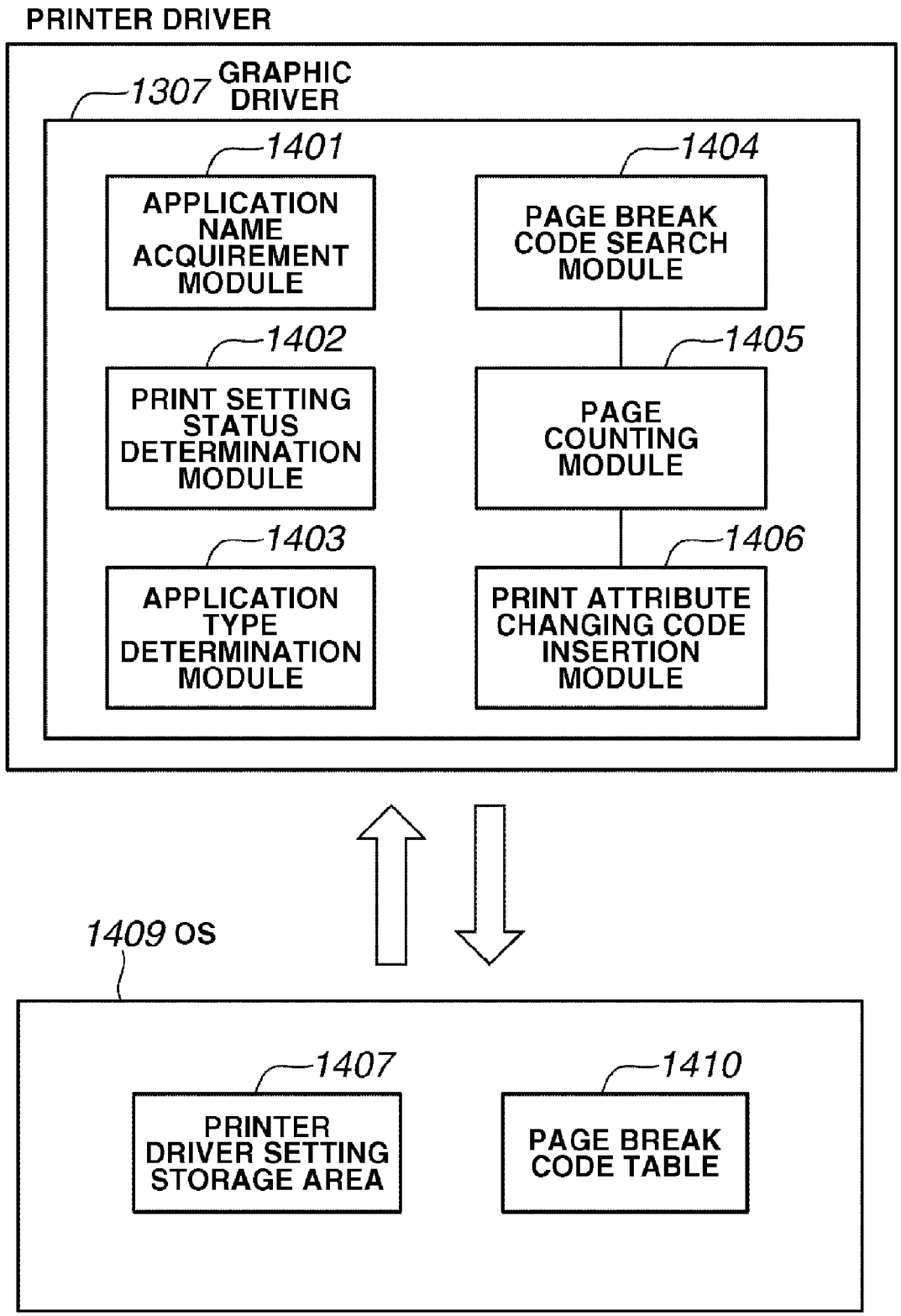
FIG. 14 illustrates an inner module of a graphic driver according to the first exemplary embodiment of the present invention.

FIG. 14 illustrates an inner module of a graphic driver 1307 of a printer driver 1305. The operation of the inner module is described with respect to the flow of an actual printing operation.

Figure 16:
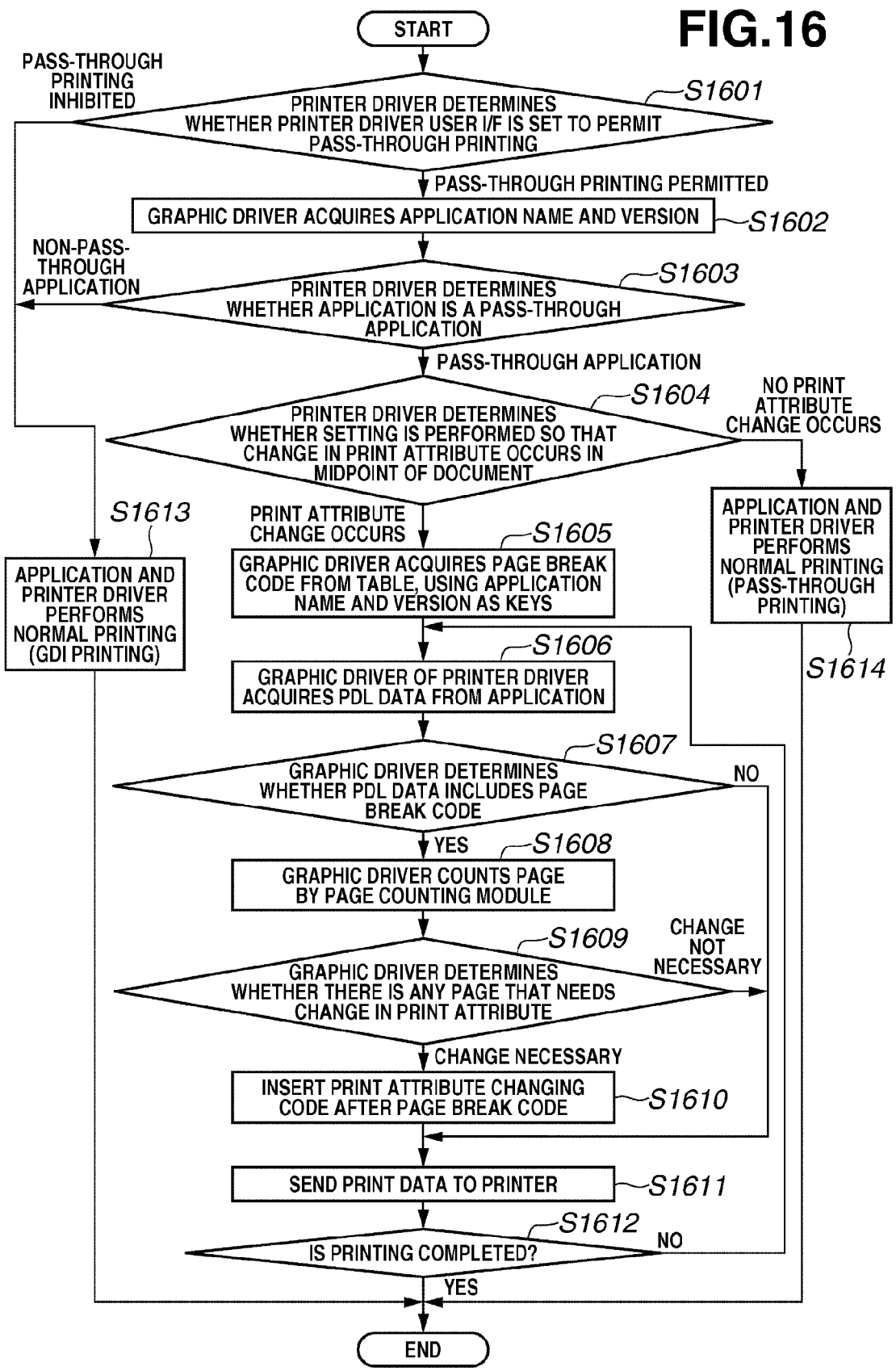
FIG. 16 is a flow chart that illustrates an operation according to the first exemplary embodiment of the present invention.

FIG. 16 illustrates print processing by the printer driver according to the present embodiment. Note that the user performs the setting for print attributes page by page as illustrated in FIGS. 5 and 6. For example, two-sided printing is set for pages 2 and 3 as an exceptional setting, and pages 4 through 8 are set to use A3 size and glossy paper as an exceptional setting. In this manner, the print attribute settings for a specific page and/or specific page range are different from the print attributes set for the entire print job.

Figure 9:
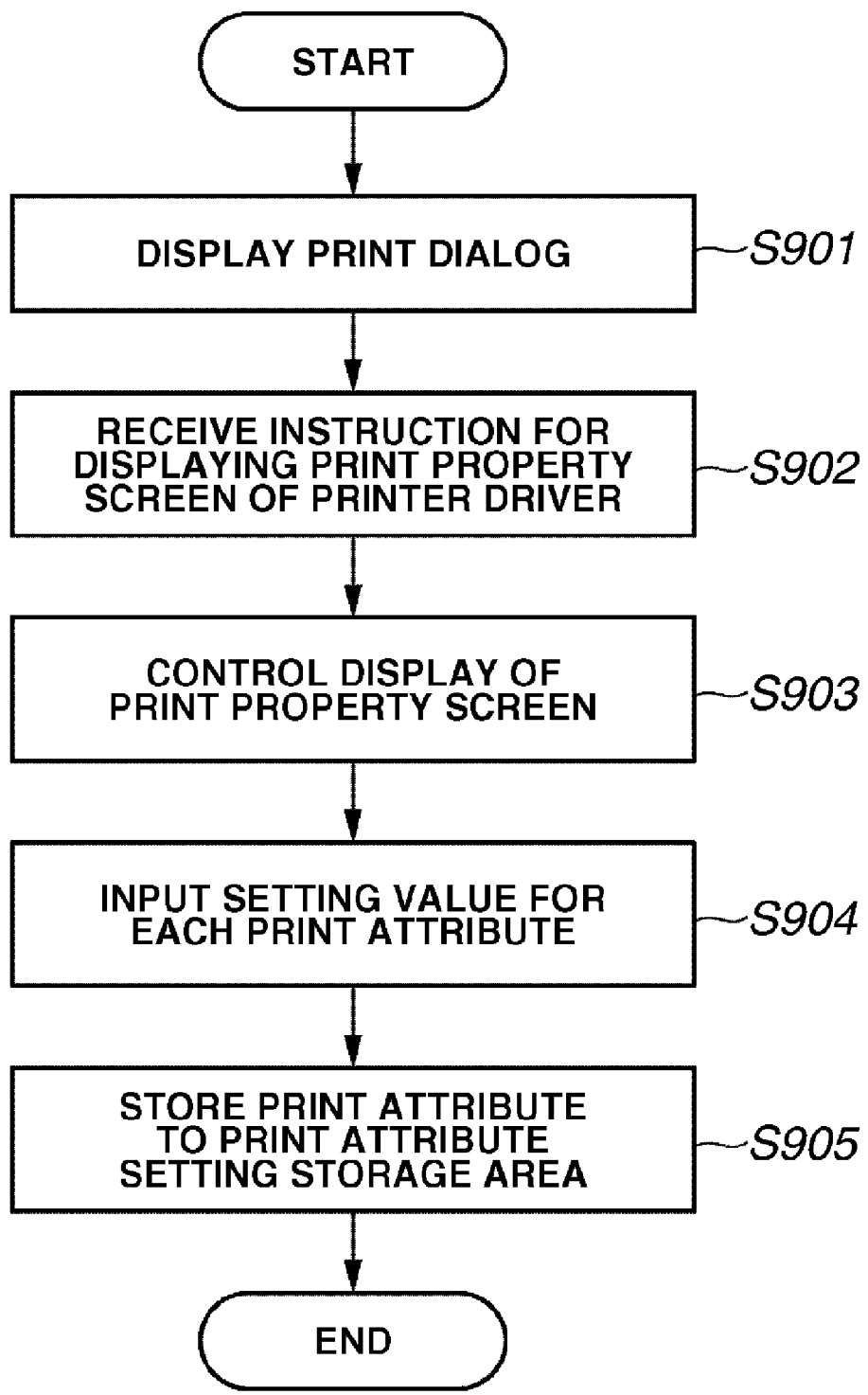
FIG. 9 is a flow chart that illustrates a flow of processing by which a user sets print attributes through the printer driver according to the exemplary embodiment of the present invention.
Figure 12:
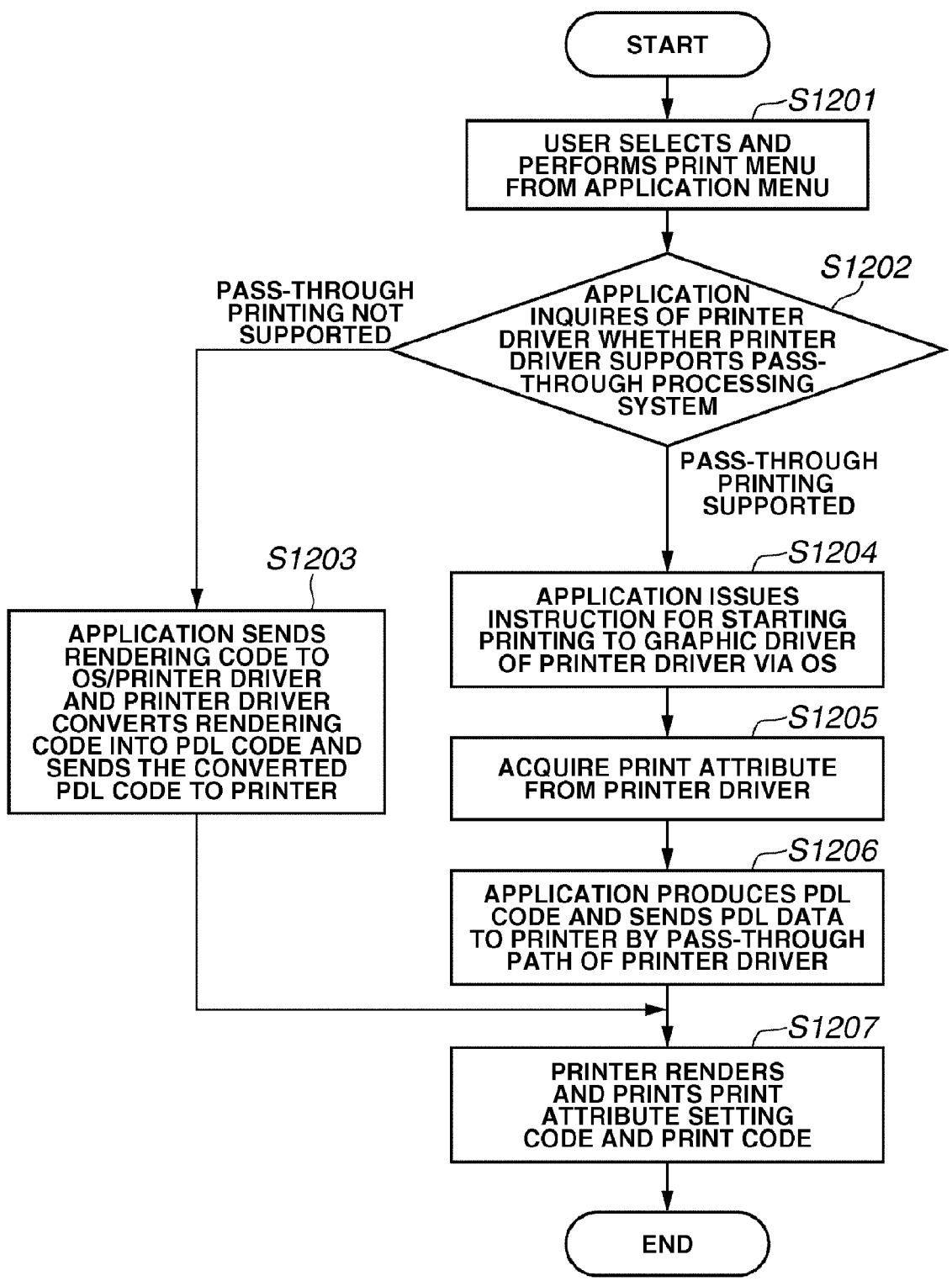
FIG. 12 is a flow chart of printing at a time of producing a PDL code by the pass-through application according to the exemplary embodiment of the present invention.

The method for setting print attributes by the user is the same as the flow chart of FIG. 9 and the method for instructing start of printing is the same as the flow chart of FIG. 12. Accordingly, the flow chart of FIG. 16 describes the operation of the printer driver for the processing in step S1206 in FIG. 12.

First, in step S1601, the printer driver determines whether a pass-through switch of a printer driver user I/F is turned on. This determination is made based on setting values for the printer driver user I/F that are stored in a printer driver setting storage area 1407 and are acquired by the printer driver through an OS 1409. The pass-through switch of the printer driver is the control field 703 illustrated in FIG. 7. The switch is used for deciding whether the production and sending of the PDL code by the pass-through application is permitted. According to operation of the switch, the printer driver responds to the pass-through application in response to an inquiry regarding pass-through support status issued from the pass-through application to the printer driver.

If the switch is set to "permit the PDL output from the application", the printer driver responds to the pass-through application that the printer driver "supports the pass-through output". When the switch is set to "inhibit the PDL output from the application", the printer driver responds to the pass-through application that the printer driver does not support the pass-through output. The switch exists in the user I/F of the printer driver because if the application itself produces the PDL code and the printer driver performs the pass-through processing, a high performance function of processing by the printer driver cannot be used. For example, poster printing, a function for enlarging and outputting a one page document into plural sheets such as 2×2 sheets, cannot be used in this case, and accordingly, the switch for determining whether the pass-through printing is permitted or inhibited is provided to the user I/F.

If the pass-through switch of the printer driver is set to inhibit the pass-through printing in step S1601, the processing advances to step S1613 to perform normal printing system, and then the processing ends. If the pass-through printing by the printer driver is permitted in step S1601, the processing advances to step S1602. In step S1602, the printer driver acquires an application name and an application version by an application name/version acquirement module 1401 of a graphic driver 1307. The printer driver is capable of acquiring the application name and the application version through an API of an OS.

In step S1603, an application type determination module 1403 of the graphic driver 1307 of the printer driver determines whether the application is a pass-through application. This determination is made by scanning the application name in the page break code table of the pass-through application in FIG. 15. In scanning the page break code table, the printer driver accesses a page break code table area 1410 through the OS 1409.

If the application name acquired in step S1602 is not a pass-through application, normal printing is performed. Accordingly, the processing advances to step S1613 to perform the normal printing, and then the processing ends. If the application is a pass-through application in step S1603, the processing advances to step S1604.

For description purposes, it is presumed that an application having an application name "application C" and a version "1" is acquired. In step S1604, the printer driver determines whether different print attribute settings are performed for each page or each page range in a special setting sheet of the printer driver user I/F. This determination is performed in a manner such that a print setting status determination module 1402 of the graphic driver 1307 accesses the printer driver setting storage area 1407 through the OS 1409. In this example, different print attributes are set to each page range as shown in the special setting list 504, and accordingly, the processing advances to step S1605.

When different attributes are not set per each page or page range in step S1604, the printer driver does not need to change the print attribute by the page break, and accordingly, the processing advances to step S1614. In step S1614, the printer driver performs normal pass-through printing, that is, sends the PDL data that the pass-through application produces, as is, to the printer.

In step S1605, the printer driver acquires a page break code of an application from the page break code table using the application name and the version number as the key. As described above, for description purposes, the application name is "application C" and the version is "1". Accordingly, the printer driver acquires the page break code "showpage" illustrated in FIG. 15.

Next, in step S1606, the printer driver acquires the PDL data from the pass-through application. Then, in step S1607, the printer driver searches the PDL code acquired by step S1606 for the page break code "showpage" acquired by step S1605. A page break code search module 1404 of the graphic driver 1307 performs the search. If the page break code "showpage" is not included in the PDL code, the processing advances to step S1611. In step S1611, the printer driver sends PDL code to the printer as is.

If the page break code "showpage" is included in the PDL code, the processing advances to step S1608 to count the pages. The counting of pages is performed by a page counting module 1405 of the graphic driver 1307. Next, in step S1609, a determination is made whether there is any page that needs a change in print attribute. If it is determined a change is necessary, the processing advances to step S1610. In step S1610, the printer driver inserts print attribute setting code immediately after the page break code "showpage". Insertion of the print attribute changing code is performed by a print attribute changing code insertion module 1406 of the graphic driver 1307. Then, the processing advances to step S1611, where the print attribute changing code is sent to the printer.

Finally, in step S1612, a determination is made whether printing has completed. If printing has completed, the process ends. If printing has not completed, flow proceeds back to step S1606. Steps S1606 through S1612 are repeated in order to produce PDL code by the pass-through application, by which the printer driver acquires the PDL data to analyze the PDL data. The pass-through application does not produce the PDL code all at once, but rather via several operations.

Figure 17:
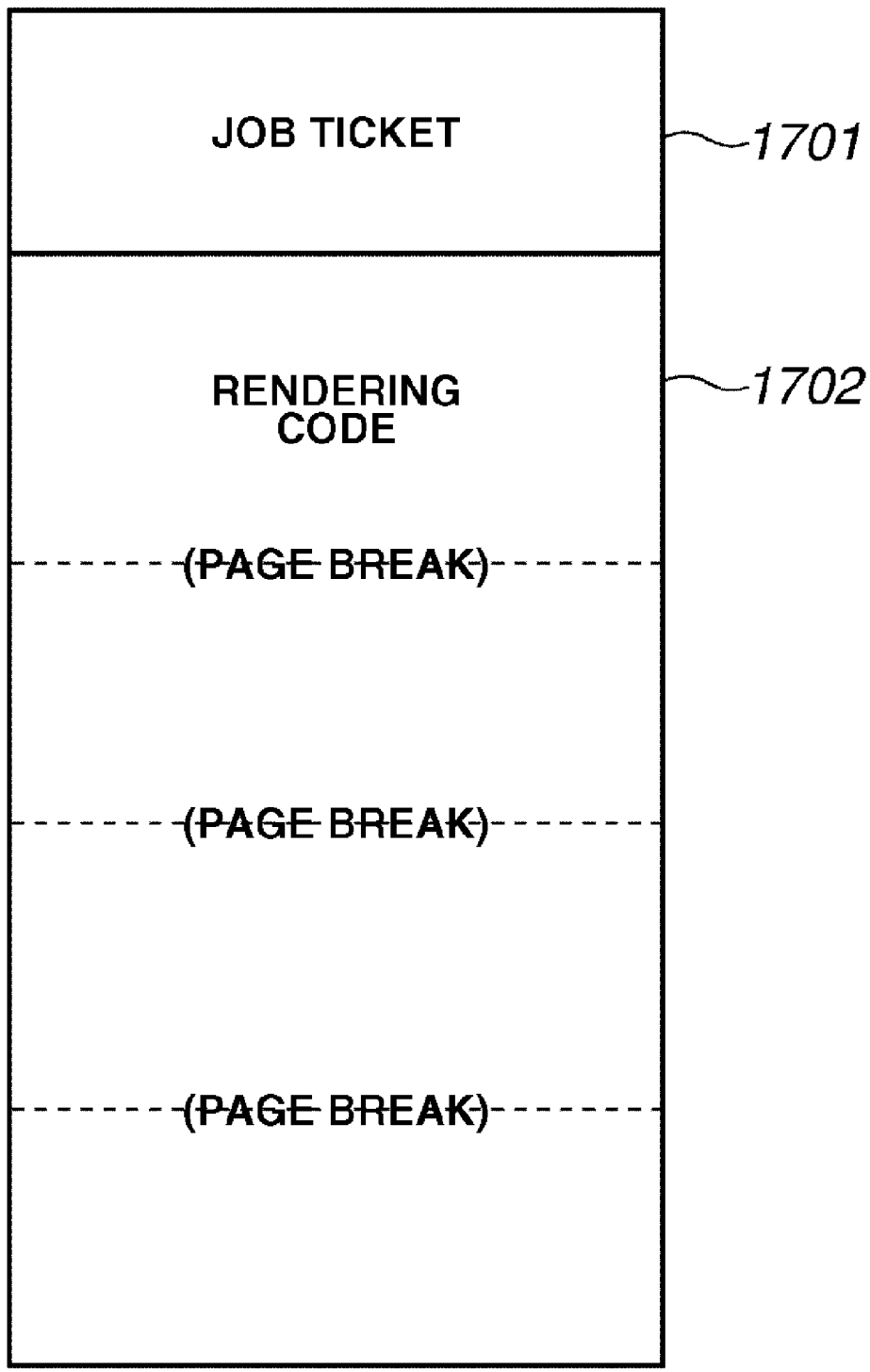
FIG. 17 illustrates a job in a conventional job ticket system.

Next, description of inserting print attribute changing code after the page break code is described FIG. 17 illustrates a structure of a print code that a conventional printer driver produces. The print code implements a setting of print attributes page by page by adding a print attribute setting code, generally called a "job ticket" 1701, to a header portion of a PDL code 1702 produced by a pass-through application that includes a page break code. In this method, the print attributes for each page are described in the job ticket 1701. Accordingly, the changing of print attributes per each page or each page range is implemented without editing the PDL code that the pass-through application produces. However, in the job ticket system, a special configuration for interpreting the job ticket needs to be provided to a printer. Thus, a print attribute changing processing for a specific page by the job ticket system cannot be implemented in a typical printer.

Figure 18:
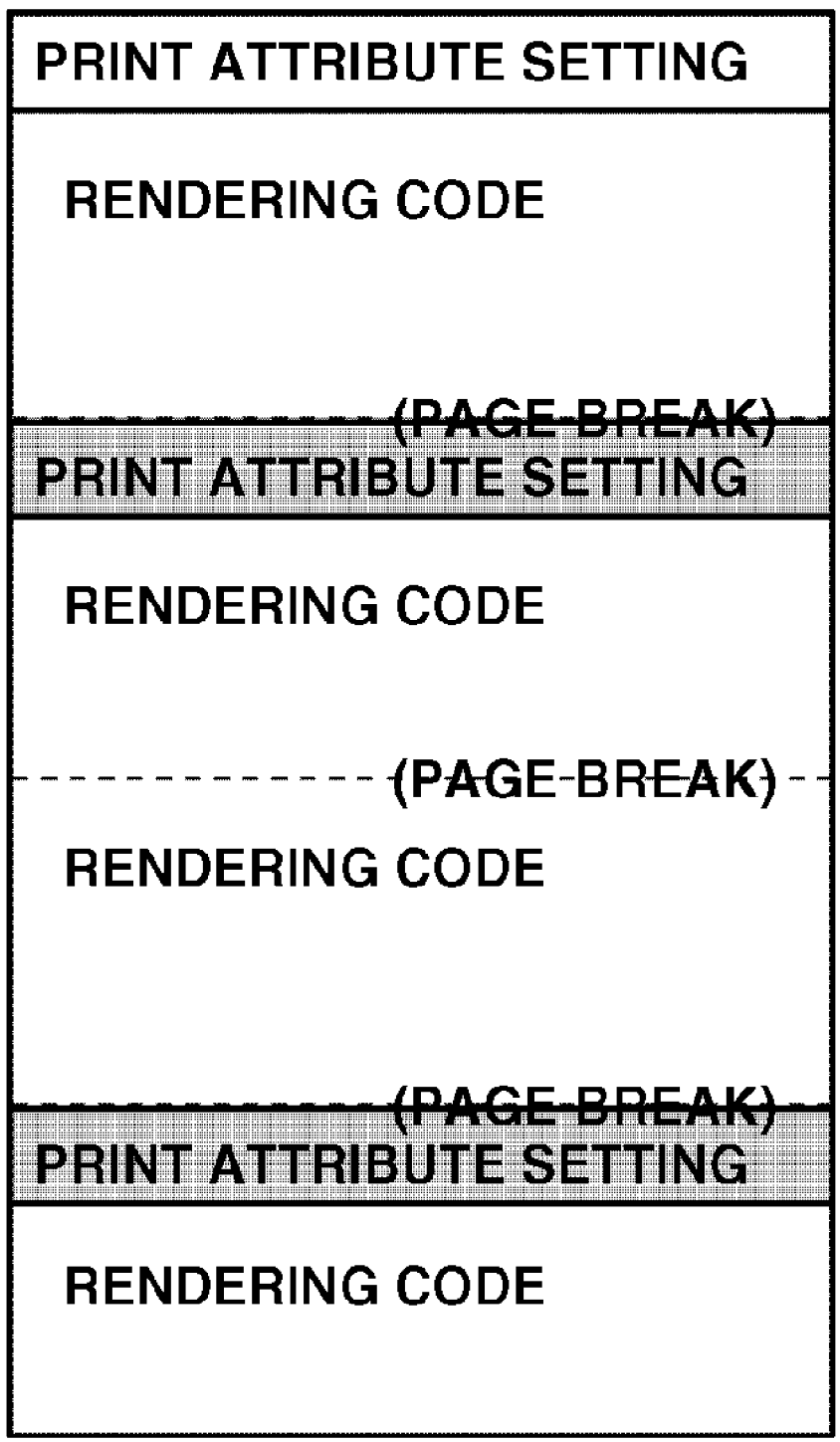
FIG. 18 illustrates a job according to the exemplary embodiment of the present invention.

FIG. 18 illustrates an example of a structure of the PDL code produced by the printer driver that uses a processing method according to the present embodiment. The printer driver scans the PDL code produced by the pass-through application, searches for the page break code for each page, and changes the print attribute by using the PDL code after the necessary page break code. The PDL code uses the print attribute and the PDL code. Accordingly, a special configuration for interpreting a job ticket illustrated in FIG. 17 is not necessary for the printer. That is, the print attributes can be changed by using a typical printer.

An example of operation according to the present embodiment will now be described. In the setting illustrated in FIG. 5, pages 2 and 3 are set to be printed by two-sided printing. Thus, the print attribute needs to be switched to two-sided printing after the page break code of page 1. FIG. 19 illustrates the PDL code produced by version 1 of application C. Referring to FIG. 19, a page break code "showpage" 1901 is a page break code that appears first. In this case, through the determination of steps S1607 and S1609, the print attribute code for changing the attribute to two-sided printing is inserted after the page break code "showpage". FIG. 20 illustrates a code into which a code for two-sided printing is inserted. Referring to FIG. 20, the code includes a page break code "showpage" 2001 for a first page and a code "<</Duplex true>>setpagedevice" 2002 for changing the attribute to two-sided printing that is inserted after the page break code 2001. By using the code, the print attribute can be changed in a midpoint of a page in the case of the PDL code produced by the pass-through application. Thus, different print attributes can be set page by page or per each page range.

FIG. 21 and FIG. 22 respectively illustrate an example of the PDL code in the case of the pass-through application having an application name "application C" and a "version 2". FIG. 21 illustrates a code before insertion of the print attribute changing code. FIG. 22 illustrates a code after insertion of the print attribute changing code. The page break code is "sp", as defined in FIG. 15. The page break code 2101 illustrated in FIG. 21 is the page break code in page 3. At this time, a code for changing the paper size to A3 and the paper type to glossy paper is inserted after the page break code 2101. FIG. 22 illustrates an example in which the code has been inserted. Referring to FIG. 22, a code 2202 changes the paper size and the paper type to A3 and glossy paper, respectively.

As described above, the printer driver searches the PDL code produced by the pass-through application for an appropriate page break code and inserts the print attribute changing code into the PDL code, and thus different print attributes can be set to a specific page or a specific page range.

Second Exemplary Embodiment

A second exemplary embodiment of the present invention will now be described. The print system of the second embodiment is similar to that of the first exemplary embodiment, and thus, only the differences will be described herein.

Figure 23:
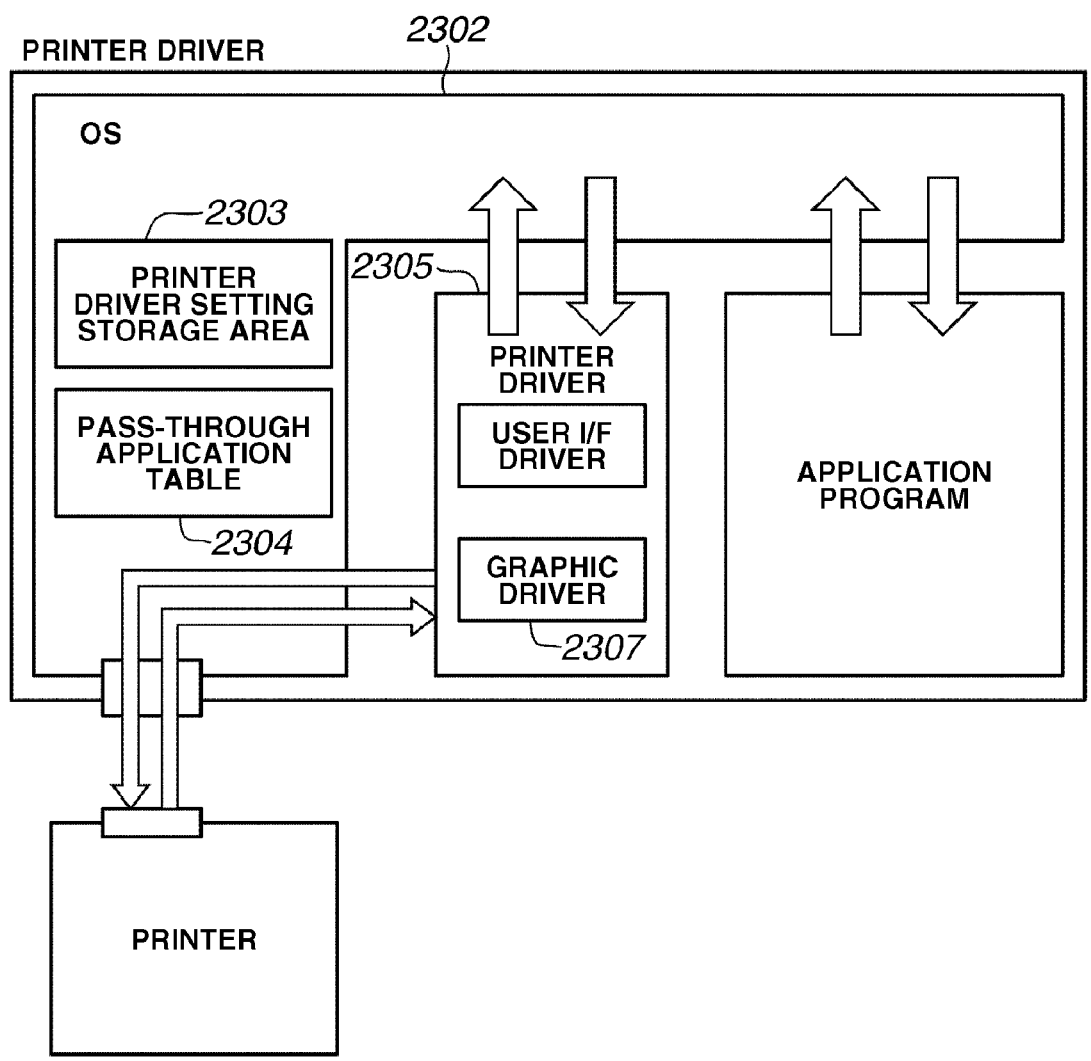
FIG. 23 illustrates a configuration of an application, an OS, and a printer driver installed on a client computer according to a second exemplary embodiment of the present invention.
Figure 24:
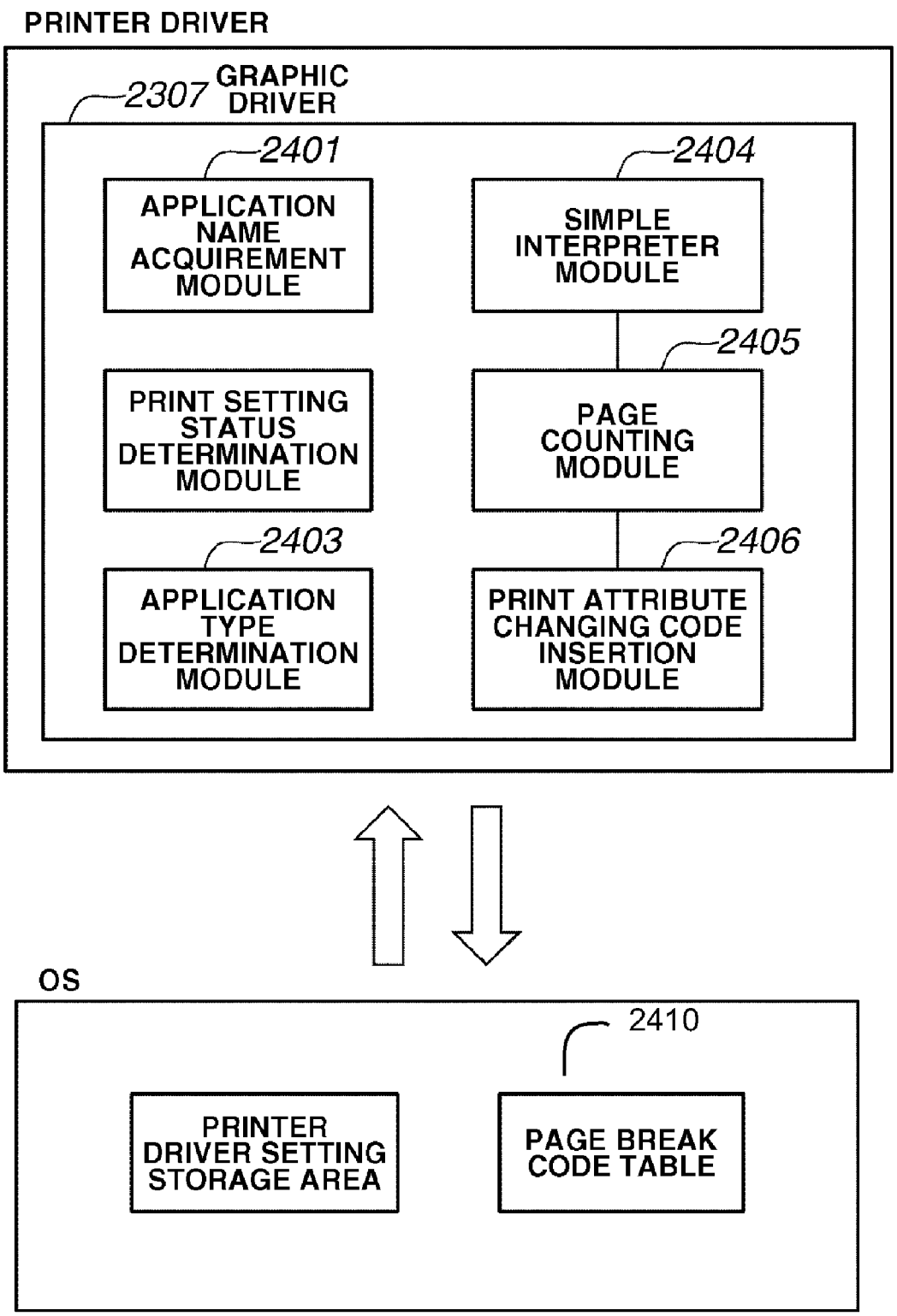
FIG. 24 illustrates an inner module of a graphic driver according to the second exemplary embodiment of the present invention.

FIG. 23 illustrates a structure of a printer driver according to the present embodiment. FIG. 24 illustrates an inner module of a graphic driver 2307 of a printer driver 2305. The operation of the module is described with reference to the flow of a printing operation.

Figure 26:
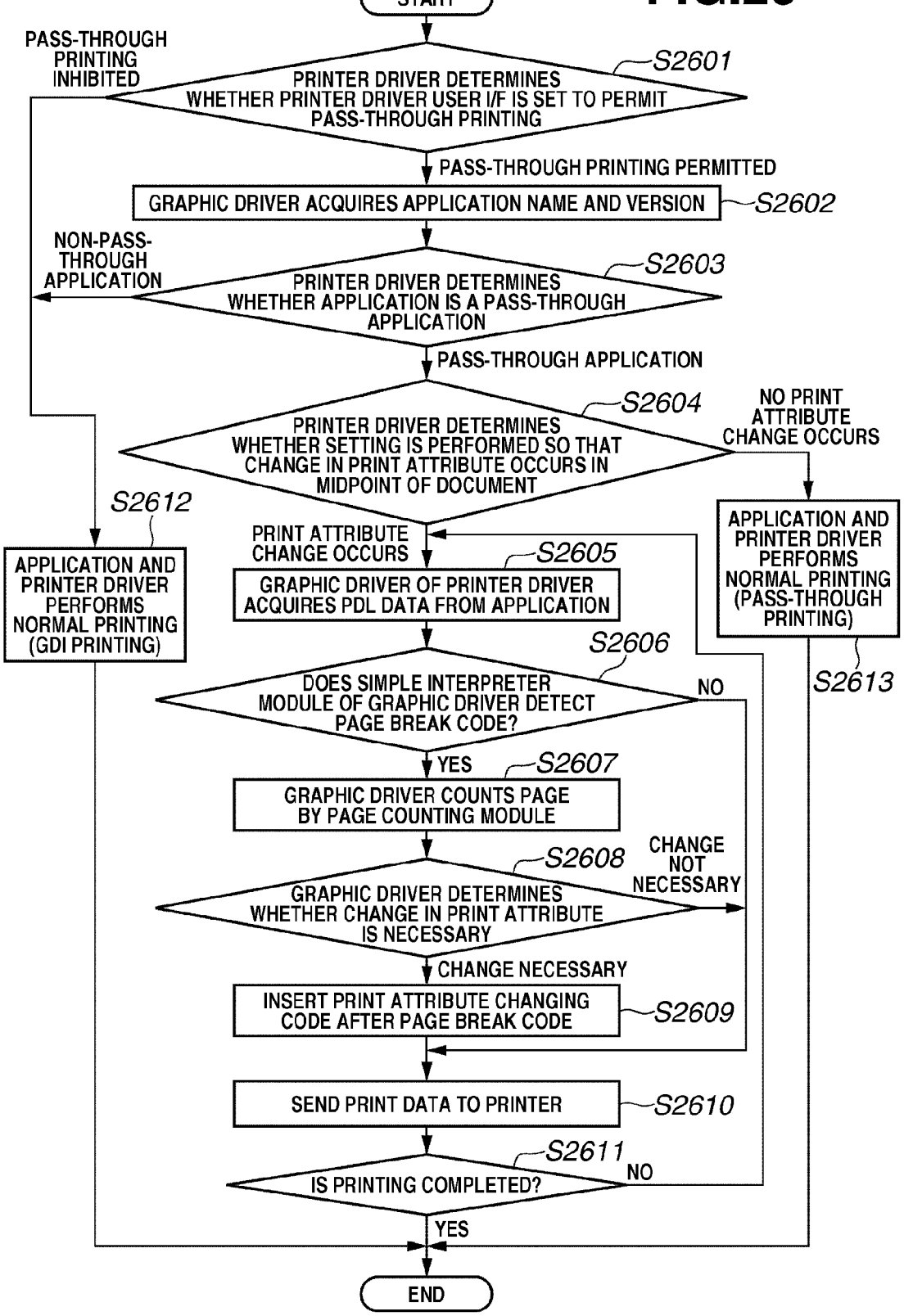
FIG. 26 is a flow chart that illustrates an operation according to the second exemplary embodiment of the present invention.

FIG. 26 is a flowchart illustrating the flow of a printing operation according to the present embodiment. The user performs print attribute setting, as in the first embodiment, per each page as illustrated in FIG. 5. That is, two-sided printing is set for pages 2 and 3 as an exceptional setting and pages 4 through 8 are set to use A3 size paper and glossy paper as an exceptional setting.

The setting of print attributes by the user is performed according to the flow chart of FIG. 9, and the instruction to start printing is provided according to the flow chart of FIG. 12. Accordingly, the flow chart of FIG. 26 describes the operation of the processing in step S1206 in FIG. 12 according to the present embodiment. First, in step S2601, the printer driver determines whether the pass-through switch of the printer driver user I/F is turned on. In order to make this determination, the graphic driver 2307 acquires setting values for the printer driver user I/F stored in the printer driver setting storage area 2303 through the OS 2302. If it is determined that the pass-through switch of the printer driver is set to inhibit the pass-through printing, flow proceeds to step S2612, where normal printing is performed. Upon completion of the printing, the process ends.

Figure 25:
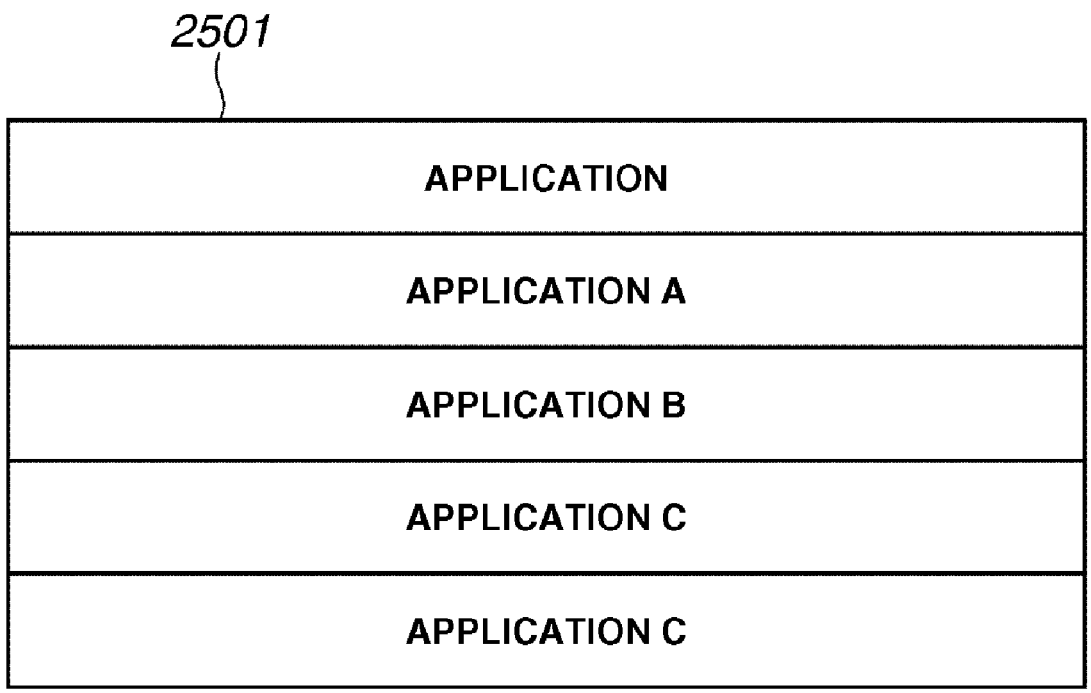
FIG. 25 illustrates a pass-through application table according to the second exemplary embodiment of the present invention.

If it is determined that the pass-through printing by the printer driver is permitted, the processing advances to step S2602. In step S2602, the printer driver acquires an application name by using an application name acquirement module 2410 of the graphic driver 2307. Then, in step S2603, an application type determination module 2403 of the graphic driver 2307 of the printer driver determines whether the application is a pass-through application. The determination is made by scanning the application name in the pass-through application table 2501 illustrated in FIG. 25. The table 2501 stores a list of pass-through applications. In scanning the application name, the printer driver accesses a page break code table 2401 through the OS 2302 for the pass-through application table.

If the application name acquired by step S2603 is not the pass-through application, flow proceeds to step S2612, where normal printing is performed and then the processing ends. If, in step S2603, the application is the pass-through application, the processing advances to step S2604. In step S2604, the printer driver determines whether different print attributes are set for each page or each page range in a special setting sheet of the printer driver user I/F. If different print attributes are set per each page or page range as illustrated in the special setting list 504 in FIG. 5, the processing advances to step S2605. However, if different attributes are not set for each page or each page range in step S2604, the printer driver does not need to change the print attribute at the page break, and the processing advances to step S2613. In step S2613, the printer driver performs a normal pass-through printing, that is, an operation for sending the PDL data, as is, that the pass-through application produces to the printer.

In step S2605, the graphic driver 2307 of the printer driver 2305 acquires the PDL data produced by the pass-through application. Then, in step S2606, a simple interpreter module 2404 of the graphic driver 2307 detects the page break code.

Next, the operation for detecting the page break code will be described. In an exemplary case, when a pass-through application outputs PDL code, the pass-through application substitutes the page break code "showpage" with another character string at a header portion of the PDL code. A character string 2701 in FIG. 27 is an example of a substituted character string. In FIG. 27, the code "showpage" is substituted with a shorter code, "sp". This substitution is performed by a simple interpreter module 2404, which is created by removing portions, such as a rendering portion and a device control portion, from an interpreter for receiving and rendering the print code installed on printer. The processing in the present embodiment is performed without relying on the determination as to the page break code described in the first embodiment. The simple interpreter module 2404 performs processing of the code 2701, for example, and detects the page break code.

Returning to FIG. 26, if in step S2606, the PDL code includes no page break instruction, the processing advances to step S2610. In step S2610, the printer driver sends the PDL code as is, to the printer. If, in step S2606, the PDL code includes a page break instruction, the processing advances to step S2607 to count the pages. The page counting is performed by a page counting module 2405 of the graphic driver 2307.

In step S2608, if the page is determined to be the page whose print attributes are to be changed, the processing advances to step S2609. In step S2609, the printer driver inserts print attribute changing code after the code corresponding to the page break code. Insertion of the print attribute changing code is performed by a print attribute changing code insertion module 2406 of the graphic driver 2307. Then, the processing advances to step S2610 to send the code to the printer.

An exemplary example of above described operation will not be provided. In the setting illustrated in FIG. 5, two-sided printing is set for pages 2 and 3. Accordingly, the print attribute needs to be changed to two-sided printing after the page break code for page 1. FIG. 27 illustrates the PDL code produced by application C. The simple interpreter module 2404 processes the code 2701, and then recognizes that the code "sp" is a page break instruction. A code "sp" 2702 is a page break instruction that appears first.

In the present example, the print attribute code for changing the attribute to two-sided printing is inserted after the code "sp". FIG. 28 illustrates a code into which a two-sided printing code is inserted. Referring to FIG. 28, the code includes a page break code "sp" 2801 for page 1 and a code 2802 "<</Duplex true>>setpagedevice" for changing the attribute to two-sided printing that is inserted after the page break code 2801. By using the code, changing of the print attribute in a midpoint of a page can be performed in the case of the PDL code produced by the pass-through application. Thus, different print attribute setting can be performed either page by page or per each page range.

As described above, the printer driver searches the PDL code produced by the pass-through application for an appropriate page break code and inserts the print attribute changing code into the PDL code. Thus, different print attributes can be set either to a specific page or a specific page range.

Other Exemplary Embodiments

The present invention can be applied to a system including a plurality of devices, such as but not limited to, a computer, an interface device, a reader, a printer, etc. In addition, the present invention can also be applied to an apparatus, such as but not limited to, a copying machine, a printer, a facsimile.

The features and aspects of the present invention can also be implemented by providing the system or the device with a storage medium which stores a program code implementing the procedures of the flow charts of each of the embodiments and by causing a computer of the system or the device to read and execute the program code stored in the storage medium. The program code itself, which is read from the storage medium, implements the function of the embodiments described above, and accordingly, the storage medium storing the program code constitutes the present invention. For the storage medium for supplying such program code, a floppy disk, a hard disk, an optical disk, a magneto-optical disk, a CD-ROM, a CD-R, a magnetic tape, a nonvolatile memory card, a ROM, and the like can be used.

In addition, the function according to the embodiments described above is implemented by the processing in which an OS or the like operating on the computer carries out a part of or the entire of the actual processing based on the instruction given by the program code.

In another aspect of the embodiments of the present invention, after the program code read from the storage medium is written in a function enhancing board inserted in the computer or a memory which is provided in a function enhancing unit connected to the computer, the CPU and the like provided in the function enhancing board or the function enhancing unit carries out apart of or the entire of the processing to implement the function of the embodiment as described above.

As described in the embodiments above, in the case where an application produces print data that a printing apparatus can interpret, an instruction for changing the print attribute in a specific page or a specific page range can be added to the print data using a print control program as the printer driver. Thus, print settings can be changed on a page-by-page basis in a typical printing apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-370099 filed Dec. 22, 2005, which is hereby incorporated by reference herein in its entirety.

What is claimed is:

1. An information processing apparatus configured to execute an application that produces print data that a printing apparatus can interpret and a print driver that transmits the print data to the printing apparatus, the information apparatus comprising:
a designating unit configured to designate a specific page or specific page range according to an instruction received via a setting screen provided by the printer driver, wherein the specific page or the specific page range is a part of the print data;
a print attribute setting unit configured to set a print attribute to the part of the print data according to the instruction received via a setting screen provided by the printer driver; and
a transmitting control unit configured to transmit the print data to the printing apparatus such that a printed material based on the print data produced by the application is printed when the print attribute is not set to the part of the print data by the print attribute setting unit, to edit the print data produced by the application such that the printed material that the print attribute is applied to is printed and to transmit the edited print data to the printing apparatus when the print attribute is set to the part of the print data by the print attribute setting unit.

2. The information processing apparatus according to claim 1, further comprising:
a page break code storage unit configured to store page break codes, wherein the transmitting control unit inserts, into the print data, a print attribute command for the specific page or the specific page range in accordance with searching the page break code stored by the page break code storage unit from the print data produced by the application.

3. The information processing apparatus according to claim 2, wherein the transmitting control unit counts pages of the print data in accordance with the search for the page break code from the print data, and
wherein when the page count is equivalent to a first page of the specific page or the specific page range, the transmitting control unit inserts, into the print data, the print attribute command for the specific page or the specific page range.

4. The information processing apparatus according to claim 1, wherein the print attribute is set for specific pages of a print job and is different than and separate from a print attribute which is set for an entire print job.

5. A method for controlling printing in an information processing apparatus configured to execute an application that produces print data that a printing apparatus can interpret and a print driver that transmits the print data to the printing apparatus, the method comprising:
designating a specific page or specific page range according to an instruction received via a setting screen provided by the printer driver, wherein the specific page or the specific page range is a part of the print data;
setting a print attribute to the part of the print data according to the instruction received via a setting screen provided by the printer driver; and
transmitting the print data to the printing apparatus such that a printed material based on the print data produced by the application is printed when the print attribute is not set to the part of the print data by the print attribute setting unit, to edit the print data produced by the application such that the printed material that the print attribute is applied to is printed, and to transmit the edited print data to the printing apparatus when the print attribute is set to the part of the print data by the print attribute setting unit.

6. The method according to claim 5, further comprising:
reading a page break codes
wherein the transmitting control unit inserts, into the print data, a print attribute command for the specific page or the specific page range in accordance with searching the page break code stored by the page break code storage unit from the print data produced by the application.

7. The method according to claim 5, wherein inserting a print attribute command includes counting pages of the print data in accordance with searching for the page break code from the print data, and wherein when the page count is equivalent to a first page of the specific page or the specific page range, the print attribute command for the specific page or the specific page range is inserted into the print data.

8. Computer-executable process steps stored on a computer-readable storage medium configured to execute an application that produces print data that a printing apparatus can interpret and a print driver that transmits the print data to the printing apparatus, the computer-executable process steps comprising:

designating a specific page or specific page range according to an instruction received via a setting screen provided by the printer driver, wherein the specific page or the specific page range is a part of the print data;

setting a print attribute to the part of the print data according to the instruction received via a setting screen provided by the printer driver; and transmitting the print data to the printing apparatus such that a printed material based on the print data produced by the application is printed when the print attribute is not set to the part of the print data by the print attribute setting unit, to edit the print data produced by the application such that the printed material that the print attribute is applied to the specific page or the specific page range is printed and to transmit the edited print data to the printing apparatus when the print attribute is set to the part of the print data by the print attribute setting unit.

9. The computer-executable process steps according to claim 8, further comprising:

reading page break codes, wherein the transmitting control unit inserts, into the print data, a print attribute command for the specific page or the specific page range in accordance with searching the page break code stored by the page break code storage unit from the print data produced by the application.

10. The computer-executable process steps according to claim 9, wherein inserting a print attribute command includes counting pages of the print data according to searching for the page break code from the print data, and wherein when the page count is equivalent to a first page of the specific page or the specific page range, the print attribute command for the specific page or the specific page range is inserted into the print data.

* * * * *